US008762672B2

(12) United States Patent
Eguchi et al.

(10) Patent No.: US 8,762,672 B2
(45) Date of Patent: *Jun. 24, 2014

(54) STORAGE SYSTEM AND STORAGE MIGRATION METHOD

(71) Applicant: Hitachi, Ltd., Tokyo (JP)

(72) Inventors: Yoshiaki Eguchi, Yokohama (JP); Yasutomo Yamamoto, Sagamihara (JP); Ai Satoyama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/765,076

(22) Filed: Feb. 12, 2013

(65) Prior Publication Data

US 2013/0159651 A1 Jun. 20, 2013

Related U.S. Application Data

(63) Continuation of application No. 11/970,249, filed on Jan. 7, 2008, now Pat. No. 8,402,234.

(30) Foreign Application Priority Data

Jan. 19, 2007 (JP) .................................. 2007-010333

(51) Int. Cl.
*G06F 12/00* (2006.01)
(52) U.S. Cl.
USPC .................................. 711/162; 707/999.201
(58) Field of Classification Search
USPC ..................... 711/162; 707/999.201
See application file for complete search history.

(56) References Cited

U.S. PATENT DOCUMENTS

| 7,069,385 | B2 | 6/2006 | Fujimoto et al. | |
|---|---|---|---|---|
| 7,484,057 | B1 * | 1/2009 | Madnani et al. | 711/161 |
| 2003/0229645 | A1 | 12/2003 | Mogi et al. | |
| 2004/0193827 | A1 * | 9/2004 | Mogi et al. | 711/170 |

(Continued)

FOREIGN PATENT DOCUMENTS

| EP | 1857918 A2 | 11/2007 |
|---|---|---|
| JP | 2004-005370 A | 1/2004 |

(Continued)

OTHER PUBLICATIONS

Japanese Office Action corresponding to Japanese Patent Application No. 2007-010333, dated Aug. 12, 2003.

(Continued)

*Primary Examiner* — Hashem Farrokh
(74) *Attorney, Agent, or Firm* — Sughrue Mion, PLLC

(57) ABSTRACT

A storage system and storage migration method where migration may be carried out to an access destination of a host apparatus without stopping the exchange of data between the host apparatus and the storage apparatus. This system is provided with a host apparatus inputting and outputting requests for data, a migration source storage apparatus having logical unit(s) correlated to storage regions of physical devices for storing the data, a migration destination storage apparatus having logical unit(s). The system also has an editing unit for editing configuration control information relating to the logical unit(s) for the migration source so as to match with settings for the migration destination storage apparatus, an importing unit for importing edited configuration control information to the migration destination storage apparatus, and a mapping unit for mapping the logical unit(s) of the migration source to the logical unit(s) of the migration destination.

14 Claims, 31 Drawing Sheets

(56) References Cited

U.S. PATENT DOCUMENTS

| | | |
|---|---|---|
| 2004/0257857 A1 | 12/2004 | Yamamoto et al. |
| 2005/0138308 A1* | 6/2005 | Morishita et al. ............ 711/162 |
| 2005/0144414 A1 | 6/2005 | Yamamoto et al. |
| 2005/0193168 A1 | 9/2005 | Eguchi et al. |
| 2005/0198457 A1 | 9/2005 | Mizuno et al. |
| 2005/0246491 A1 | 11/2005 | Yamamoto et al. |
| 2006/0015697 A1 | 1/2006 | Morishita et al. |
| 2006/0064441 A1* | 3/2006 | Yamamoto .................... 707/201 |
| 2006/0095700 A1 | 5/2006 | Sato et al. |
| 2006/0168411 A1 | 7/2006 | Ohno et al. |
| 2006/0224844 A1 | 10/2006 | Kano et al. |
| 2006/0224850 A1 | 10/2006 | Yamamoto et al. |
| 2006/0271758 A1 | 11/2006 | Innan et al. |
| 2007/0055840 A1 | 3/2007 | Yamamoto et al. |
| 2007/0067593 A1 | 3/2007 | Satoyama et al. |
| 2007/0204057 A1* | 8/2007 | Shaver et al. ................ 709/231 |

FOREIGN PATENT DOCUMENTS

| | | |
|---|---|---|
| JP | 200413454 A | 1/2004 |
| JP | 2004-220450 A | 8/2004 |
| JP | 2004-240949 A | 8/2004 |
| JP | 2005-011277 A | 1/2005 |
| JP | 2005182708 A | 7/2005 |
| JP | 2006-31367 A | 2/2006 |
| JP | 2006127398 A | 5/2006 |

OTHER PUBLICATIONS

European Search Report corresponding to European Patent Application No. 08250027.3, dated Oct. 7, 2011.

* cited by examiner

| TARGET ID | 9011 |
| DEVICE ID | 9012 |
| ALTERNATE PATH GROUP INFORMATION | 9013 |
| INITIATOR PORT | 9014 |
| LDEV NUMBER | 9015 |
| RESERVE INFORMATION | 9016 |
| PORT GROUP INFORMATION | 9017 |
| MIGRATION INFORMATION | 9018 |

901

STORAGE SYSTEM AND STORAGE MIGRATION METHOD

CROSS-REFERENCES TO RELATED APPLICATIONS

This is a Continuation of application Ser. No. 11/970,249 filed Jan. 7, 2008, claiming priority based on Japanese Patent Application No. 2007-010333, filed on Jan. 19, 2007, the contents of all of which are incorporated herein by reference in their entirety.

BACKGROUND

1. Field of the Invention

The present invention relates to a storage system and storage migration method that are particularly suited to application to a storage system requiring storage migration.

2. Description of Related Art

In recent years, storage systems handling massive amounts of data manage data using large capacity storage apparatuses provided separately from host apparatuses.

With this kind of storage system, it is necessary to transfer an access destination of a host apparatus to a new storage apparatus or to another storage apparatus at the time of the introduction of a new storage apparatus or while clustering a storage apparatus and migrating to another storage apparatus. In this event, it is preferable for migration of the access destination of this host apparatus to take place without transfer of data between the host apparatus and the storage apparatus stopping, and while maintaining the function of the storage apparatus.

Technology for saving vast amounts of data that has exceeded the system lifetime is disclosed in patent document 1. According to this patent document, technology is disclosed where, in order to replace storage apparatuses (hereinafter referred to as migration source storage apparatuses) to which technology for connecting external storage is applied with other storage apparatuses (hereinafter referred to as migration destination storage apparatuses), data stored in logical units in the possession of the migration source storage apparatuses is copied to logical units in the possession of migration destination storage apparatus so as to achieve migration.

[Patent Document 1]

Japanese Patent Laid-open Publication No. 2005-011277.

However, in the event of migrating an access destination accessed by a host apparatus to a new storage apparatus, with the existing mechanism, this involves operations such as the replacing of cables, and resulting in the problem that the exchange of data between the host apparatus and the storage apparatus is therefore temporarily stopped.

Further, in the event of carrying out migration to an access destination for a certain host apparatus between storage apparatuses (between old models and new models of storage apparatuses of the same vendor, or between storage apparatuses where the vendor is different) of different types, situations where it is necessary to change microprograms on the side of the storage apparatus before migration are common, and changes in processing to perform migration are therefore troublesome.

Moreover, there is also the possibility of, for example, deterioration occurring as the result of excessive loads being applied to the side of the migration source storage apparatus as a result of falling in the processing performance of input/output processing etc. occurring on the side of the migration source storage apparatus, while carrying out processing to copy from the logical units of the migration source to the logical units of the migration destination.

In order to take the above points into consideration, the present invention proposes a storage system and storage migration method where migration may be carried out to an access destination of a host apparatus without stopping the exchange of data between the host apparatus and the storage apparatus, and while continuing the functions of the storage apparatus.

SUMMARY

In order to resolve the aforementioned problems, the storage system of the present invention is comprised of a host apparatus inputting and outputting requests for data, a migration source storage apparatus capable of being recognized from the host apparatus, having one or more logical units correlated to storage regions of physical apparatuses for storing the data, a migration destination storage apparatus having one or more logical units of a migration destination capable of being recognized from the host apparatus, an editing unit for editing configuration control information relating to the logical unit(s) for the migration source so as to match with settings for the migration destination storage apparatus, an importing unit for importing edited configuration control information that is the configuration control information edited to the migration destination storage apparatus, and a mapping unit for mapping the logical unit(s) of the migration source to the logical unit(s) of the migration destination.

As a result, it is possible to map logical units in such a manner as to match with settings for a migration destination storage apparatus without stopping exchange of data with the host apparatus.

Further, a storage migration method of the present invention comprises the steps of a host apparatus inputting and outputting requests for data, a migration source storage apparatus capable of being recognized from the host apparatus, having one or more logical units correlated to storage regions of physical apparatuses for storing the data, the migration destination storage apparatus having one or more logical unit(s) for a migration destination capable of being recognized from the host apparatus, editing configuration control information relating to the logical unit(s) for the migration source so as to match with settings for the migration destination storage apparatus, importing edited configuration control information that is the configuration control information edited to the migration destination storage apparatus, and mapping the logical unit(s) of the migration source to the logical unit(s) of the migration destination.

As a result, it is possible to map logical units in such a manner as to match with settings for a migration destination storage apparatus without stopping exchange of data with the host apparatus.

Other aspects and advantages of the invention will be apparent from the following description and the appended claims.

DETAILED DESCRIPTION OF PREFERRED EMBODIMENTS

First Embodiment

Configuration of Storage System of the First Embodiment

First, a description is given in the following of a storage system of the first embodiment.

Figure 1:
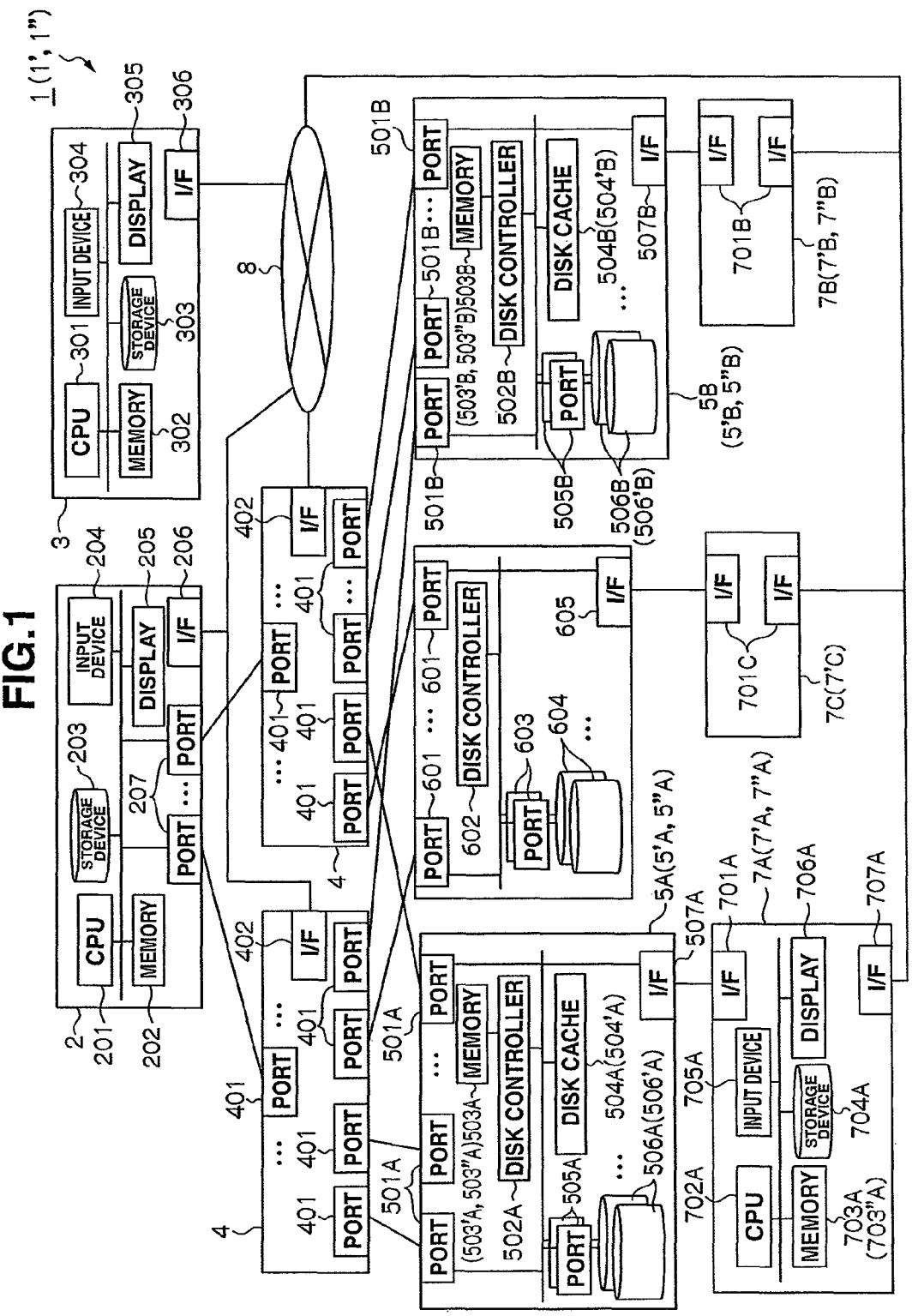
FIG. 1 is a block view showing an overall configuration for a storage system of a first embodiment.

In FIG. 1, numeral 1 is the whole of a storage system of the first embodiment.

This storage system 1 is configured in such a manner that a host apparatus 2 is connected to a migration source storage apparatus 5A, migration destination storage apparatus 5B, and an external storage apparatus 6 via a fibre channel switch 4 constituting a fibre channel network. The migration source storage apparatus 5A, migration destination storage apparatus 5B and external storage apparatus 6 are respectively connected to a management terminal 7, and the host apparatus 2, a management server 3, fibre channel switch 4, and respective management terminals 7 are connected to each other via a network 8.

Specifically, at the host apparatus 2, the port 207 is connected to the port 401 of the fibre channel switch 4. Further, at the migration source storage apparatus 5A, migration destination storage apparatus 5B and external storage apparatus 6, respective ports 501 and 601 are connected to ports 401 of the fibre channel switch 4. At the management server 3, an interface control unit 306 is connected to the host apparatus 2, fibre channel switch 4, and interface control units 206, 402, 701 of the management terminal, so as to enable management of the host apparatus 2, migration source storage apparatus 5A, migration destination storage apparatus 5B, external storage apparatus 6 and management terminal 7.

A description is now given of each apparatus of the storage system 1 described above.

The host apparatus 2 is configured from a CPU 201, memory 202, storage device 203, input device 204, display 205, interface control unit 206 and a plurality of ports 207. The CPU 201 is a processor for controlling the overall operation of the host apparatus 2, and the CPU 201 reads out software stored in the storage device 203 to the memory 202 and carries out predetermined information processing on the whole of the host apparatus 2 by executing this software. The host apparatus 2 receives input from the host administrator via the input device 204 and displays information processing results etc. at the display 205. The interface control unit 206 is a LAN (Local Area Network) adapter for connecting to the network 8. The plurality of ports 207 constitute a SAN (Storage Area Network) for connecting to the fibre channel switch 4. The storage device 203 is, for example, a disk device or optical magnetic disk device, etc. Further, the input device 204 is a keyboard or mouse, etc.

The management server 3 is comprised of a CPU 301, memory 302, storage device 303, input device 304, display 305 and interface control unit 306. The management server 3 executes information processing by executing software stored at the storage device 303 using the CPU 301 via the memory 302, and maintains and manages the whole of the storage system. When the storage management software is executed by the CPU 301, the management server 3 collects configuration information, performance monitoring information, and error logs etc. for the host apparatus 2, migration source storage apparatus 5A, migration destination storage apparatus 5B, external storage apparatus 6, and management terminal 7 from the interface control unit 306 via the network 8. The management server 3 then instructs the administrator to output the collected information to the display 305. Further, when an instruction relating to maintenance and management is received from the administrator via the input device 304, the management server 3 sends this instruction to the host apparatus 2, migration source storage apparatus 5A, migration destination storage apparatus 5B, external storage apparatus 6, and management terminal 7.

The migration source storage apparatus 5A is comprised of a plurality of ports 501A for connecting to the fibre channel switch 4, a plurality of memory 503A functioning as a work area for the disk controller 502A for controlling data input/output processing to the disk 506A, disk cache 504A for temporarily storing data, one or more ports 505A functioning as an interface for connecting to a disk 506A, the disk 506A for storing data, and an interface control unit 507A for connecting with the management terminal 7A.

The disk controller 502A specifies a logical unit LU for an access destination based on information contained in an input/output request received from the host apparatus 2 via the port 501a. In the event that the logical unit LU of the access destination corresponds to the disk (internal device) 506A, the disk controller 502A controls input and output of data to the disk 506A. In the event that the logical unit LU of the access destination corresponds to the external storage apparatus (external device) 6, the disk controller 502A controls input and output of data for the external storage apparatus 6.

The migration source storage apparatus 5A has the following tiered storage system. Namely, a disk array is configured from a plurality of disks 506A. This disk array is managed as a physical device by the disk controller 502A. Further, the disk controller 502A correlates the physical devices mounted on the migration source storage apparatus 5A and the logical units LU. The logical units are managed within the migration source storage apparatus 5A, and numbers for the LU's are managed by the migration source storage apparatus 5A.

The logical units LU correlate to LUN (Logical Unit Numbers) allocated to each port 505A, and are supplied to the host apparatus 2 apparatuses within the migration source storage apparatus 5A. That recognized by the host apparatus 2 are logical units within the migration source storage apparatus 5A, and the host apparatus 2 accesses data stored in the migration source storage apparatus 5A using a LUN in order to identify logical units LU allocated to the ports 505A.

In this embodiment, the disk controller 502A manages logical units LU of the external storage apparatus 6 as an external volume PLU that is virtualized as a device (internal device) within the migration source storage apparatus 5A. The external volume PLU incorporated within the migration source storage apparatus 5A is managed as a logical unit within the migration source storage apparatus 5A in the same way as for a physical device within the migration source storage apparatus 5A.

The disk controller 502A converts input/output requests from the host apparatus 2 to an access request to the disk 506A within the migration source storage apparatus 5A or an access request to the disk 604 within the external storage apparatus 6.

The disk controller 502A controls not only data input/output processing to the disk 506A but also data copying and relocation between volumes, etc. The disk controller 502A is connected to the management terminal 7A via the interface control unit 507A, receives change configuration instructions inputted to the management terminal 7A by the administrator, and is capable of changing the configuration of the migration source storage apparatus 5A.

The disk cache 504A is memory for temporarily storing data inputted between the host apparatus 2 and the disk 506A, and is, for example, semiconductor memory. The migration source storage apparatus 5A stores data received from the host apparatus 2 in the disk cache 504A, returns write completion notification to the host apparatus 2, and destages the data at the disk 506A after this.

Configuration information for the migration source storage apparatus 5A is stored in the memory 503A. When configuration information stored in the memory is lost, the disk controller 502A can no longer access the disk 506A. Power supply back-up or redundancy is therefore provided for the memory 503A in order to improve disaster tolerance.

The management terminal 7A is comprised of an interface control unit 701A, CPU 702A, memory 703A, storage device 704A, input device 705A, display 706A and interface control unit 707A. The interface control units 701A, 707A are communication interfaces for connecting to the storage system 1. By executing reading out of storage management programs stored in the storage device 704A to memory, the CPU 702A refers to the configuration information, changes the configuration information, and instructs operations for specific functions. The storage device 704A is, for example, a disk device or optical magnetic disk device, etc. Further, the input device 705A is a keyboard or mouse, etc. The display 706A supplies a user interface environment for storage use and, for example, displays configuration information and management information etc. of the storage system 1.

The external storage apparatus 6 is configured from one or more ports 601 for connecting to port 501A and 501B of the migration source storage apparatus 5A and the migration destination storage apparatus 5B via the fibre channel switch 401, one or more disk controllers 702 for controlling processing for inputting and outputting data to and from the disk 604, one or more ports 603 functioning as an interface for connecting the disk controller 602 to the disk 604, one or more disk 604 for storing data, and an interface control unit 605 functioning as an interface for connecting to the network.

The migration destination storage apparatus 5B has the same configuration as the migration source storage apparatus 5A, and management terminals 7B and 7C have the same configuration as management terminal 7A and are therefore not described.

With this embodiment, a network configuration may be adopted where the storage system 1 is connected directly to the management server 3 without passing via the management terminal 7, with the storage system 1 then being managed by management software operating on the management server 3.

(1-2) Logical Unit Migration Processing Theory

Figure 2:
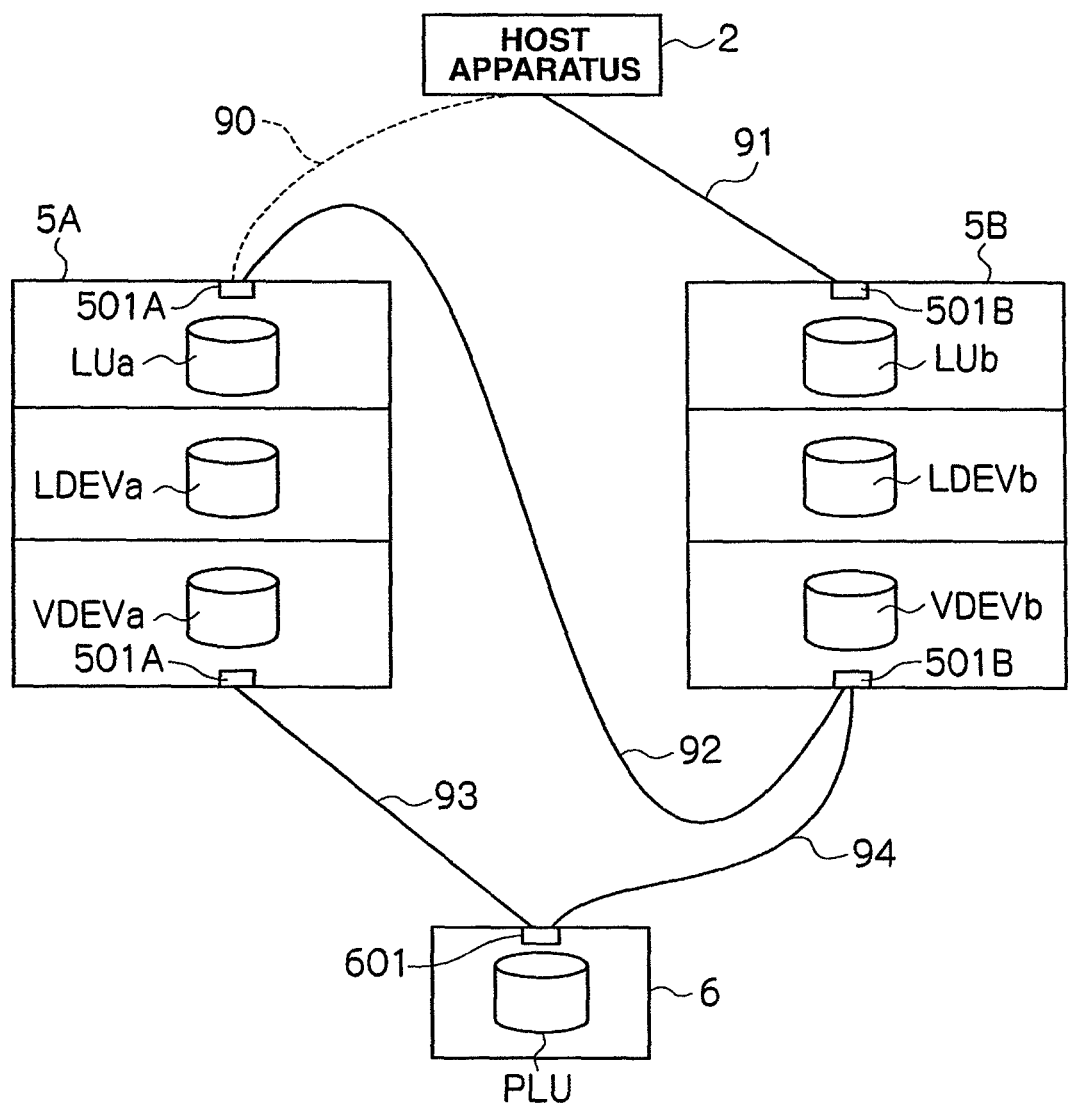
FIG. 2 is an outline view of the theory for logical unit migration processing of the first embodiment.
Figure 3:
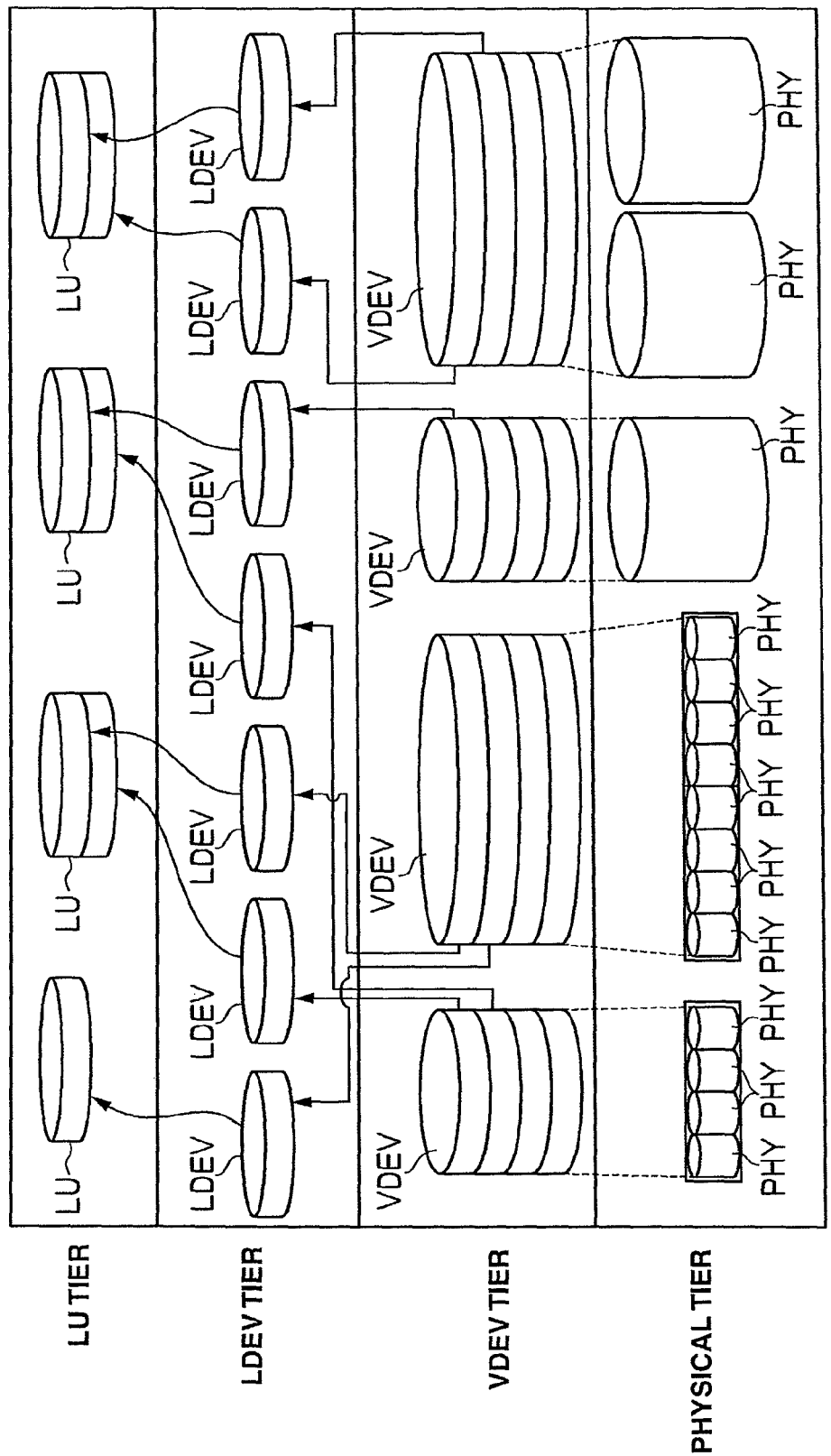
FIG. 3 is an outline view describing the theory for logical unit migration processing of the first embodiment.

Next, a description is given of the theory of migration processing for logical units in this embodiment. In FIG. 2 and FIG. 3, portions corresponding to portions of FIG. 1 are given the same numerals and these portions are not described.

The migration source storage apparatus 5A is equipped with one or more migration source logical units. LUN's are then allocated to the logical units LU of the migration sources. The logical units LU of the migration sources are supplied to the host apparatus 2 as logical storage regions. The host apparatus 2 is capable of writing data to logical units LU of the migration sources and is capable of reading data from logical units LU of the migration source.

A plurality of intermediate storage tiers are provided at the lower tier of the logical units LU of the migration sources. The intermediate storage tier is a logical storage resource for correlating between the logical units of the migration sources and the external volumes PLU. LU accesses from the host apparatus 2 are transmitted to the external volumes PLU via the intermediate storage tiers from the logical units LU of the migration source.

For example, logical devices and lower tier devices may be included at the intermediate storage tier within the migration source storage apparatus 5A. Each of these devices is by no means essential and some of the devices may be omitted.

The migration source storage apparatus 5A is comprised of a logical device LDEVa for mapping the one or more ports 501A for connecting to the host apparatus 2 via a path 90 and the migration source logical units LUa allocated to the ports 501A to the logical units of the migration source, and a virtual device VDEVa that can be mapped to the logical device LDEVa.

Here, "mapping/to map devices" refers to correlating an address space of a certain device with an address space of another device. In this embodiment, mapping of a certain device to another device is synonymous with correlating or allocating a certain device with/to another device.

The migration source storage apparatus 5A is connected to the external storage apparatus 6 via a path 93.

The external storage apparatus 6 has an external volume PLU defined on a physical device 604 having a real storage region such as a disk etc.

The virtual device VDEVa is tiered storage connecting upstream tiered storage and downstream tiered storage to give the physical device 604. The virtual device VDEVa is tiered storage where storage regions respectively provided by a plurality of physical devices 505A constitute a RAID (Redundant Arrays of Inexpensive/Independent Disks).

The logical device LDEVa is a storage region collecting all or part of storage regions of one or a plurality of virtual devices VDEVa or a storage region extracting part of the storage region of the virtual device VDEVa.

The logical unit LUa virtualizes an external volume PLU, and is a logical storage region recognized by the host apparatus 2. An inherent LUN is allocated to the logical unit LU.

On the other hand, the migration destination storage apparatus 5B has a plurality of tiered storage tiered in the same way as the migration source storage apparatus 5A. The migration destination storage apparatus 5B is comprised of a logical device LDEVb for mapping the one or more ports 501B for connecting to the host apparatus 2 via a path 91 and the source/destination logical units LUb allocated to the ports 501B to the logical units LUb of the migration source/destination, and a virtual device VDEVb that can be mapped to the logical device LDEVb.

Next, a general description is given of processing for migrating data in logical units LUa of the migration source within the migration source storage apparatus 5A configured in the above manner to logical units LUb of the migration destination within the migration destination storage apparatus 5B.

For means of convenience, in order to describe the migration processing of the logical units LU, a correspondence relationship of the logical units LU and the logical devices LDEV is taken to be one to one, a correspondence relationship of the logical devices LDEV and the virtual devices VDEV is taken to be one to one, and a correspondence relationship of the virtual device VDEV and the physical device PHY is taken to be one to one, but as shown in FIG. 3, the respective correspondence relationships may also be one to many relationships.

First, the migration destination storage apparatus 5B defines a path 94 for externally connecting across the external volume PLU and the migration destination storage apparatus 5B, and makes a virtual device VDEV having the same storage capacity as the external volume PLU within the migration destination storage apparatus 5B.

The migration destination storage apparatus 5B defines a path 92 for connecting across the logical unit LUa of the migration source and the transfer destination storage apparatus 5B.

The migration destination storage apparatus 5B then makes a logical device LDEVb having the same logical configuration as the logical configuration of the logical device LDEVa within the migration destination storage apparatus 5B. The virtual device VDEVb is then mapped to the logical device LDEVb.

The migration destination storage apparatus 5B makes a logical unit LUb of a migration destination having the same logical configuration as the logical configuration of the logical unit LUa of the migration source within the migration destination storage apparatus 5B, and defines a path 91 for connecting the host apparatus 2 and the logical unit LUb of the migration destination. The logical device LDEVb is mapped to the logical unit LUb.

The host apparatus 2 then switches of from path 90 to path 91 as a route for accessing the external volume PLU.

As a result of this processing, the logical unit LUb of the migration destination is not just a virtualized version of the logical unit LUa of the migration source, but is also a virtualized version of the external volume PLU. This therefore gives an external volume PLU with a data input/output path from the host apparatus 2 to the migration source logical unit LUa during logical unit migration processing passing via the path 91, migration source storage apparatus 5B, path 92, migration source storage apparatus 5A, and path 93.

The migration source storage apparatus 5A sets the operation mode of the migration source storage apparatus 5A to cache-through mode in order to destage all of the dirty data accumulated in the disk cache 504A of the migration source storage apparatus 5A to the external volume PLU.

Here, "dirty data" refers to as yet unreflected data that has not been destaged from the disk cache 504A to the external volume PLU. Further, "cache-through mode" refers to an operation receiving data write requests from the host apparatus 2, storing data in the disk cache 504A, and reporting completion of data updating to the host apparatus 2 from writing this data to the disk 505A.

When all dirty data accumulated in the disk cache 504A of the migration source storage apparatus 5A is destaged to an external volume, the migration destination storage apparatus 5B eliminates the pathes 90, 93.

According to this method, it is possible to migrate a logical unit LUa of the migration source while continuing input/output processing of data from the host apparatus 2 to the logical unit LUa of the migration source. As a result, it is possible to implement load distribution of the storage system 1 by switching taking charge of the data input/output processing to the external volume PLU between the plurality of storage apparatuses 5A, 5B.

(1-3) Migration Function

Next, a description is given of a migration function mounted on a storage system 1 of this embodiment.

This storage system 1 is characterized by editing configuration control information 901 to 904 relating to logical units LUa of the migration origin in such a manner as to match settings of migration destination storage apparatus 5B during mapping of logical units LUa of the migration source of the migration source storage apparatus 5A to the logical units LUb, takes in the edited edit configuration control information to the migration destination storage apparatus 5B, and maps the logical units LUa of the migration source to the logical units LUb of the migration destination matching with the settings of the migration destination storage apparatus 5B. It is therefore possible to perform migration of the storage apparatus without stopping inputting and outputting of data from the host apparatus 2.

(1-3-1) Configuration Control Information

Figure 4:
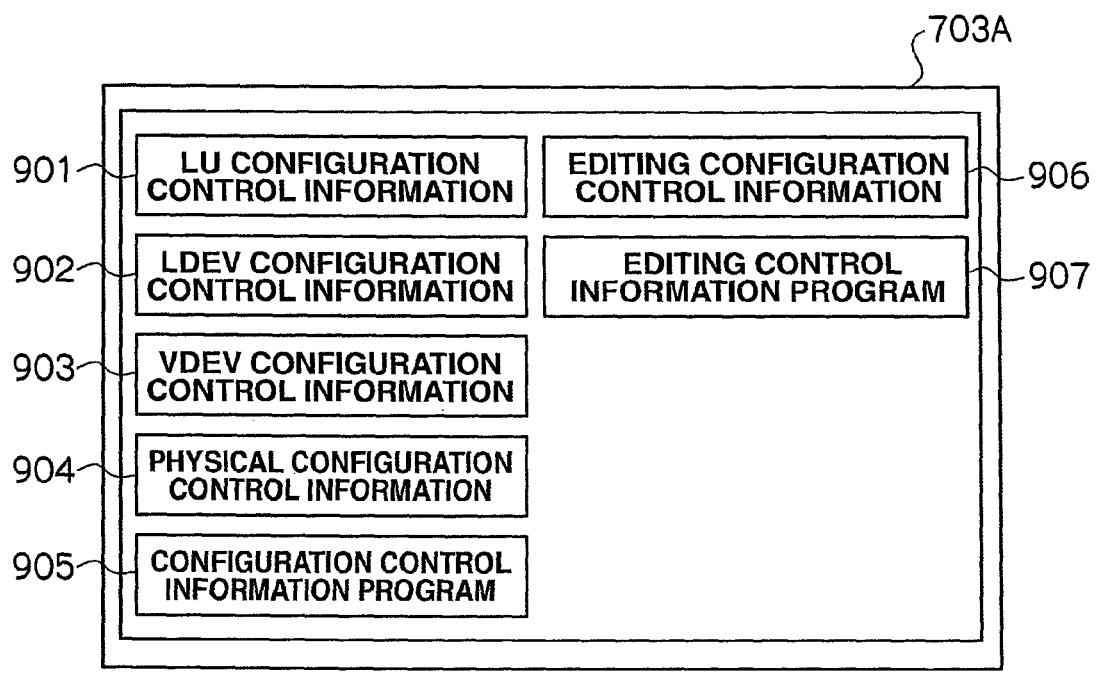
FIG. 4 is a block view showing within memory of a management terminal of the first embodiment.

In order to implement this kind of migration function, as shown in FIG. 4, LU configuration control information 901, LDEV configuration control information 902, VDEV configuration control information 903, physical configuration control information 904, configuration control information program 905, editing control configuration information 906 that is configuration control information relating to the logical units LUa of the migration source that is edited in such a manner as to match with the settings of the migration destination storage apparatus 5B, and an editing control information program 907 for managing this editing control configuration information are stored in the memory 703A of management terminal 7A. The producing and changing etc. of each type of configuration control information is carried out by the management terminal 7A based on the configuration control information program 905.

Figure 5:
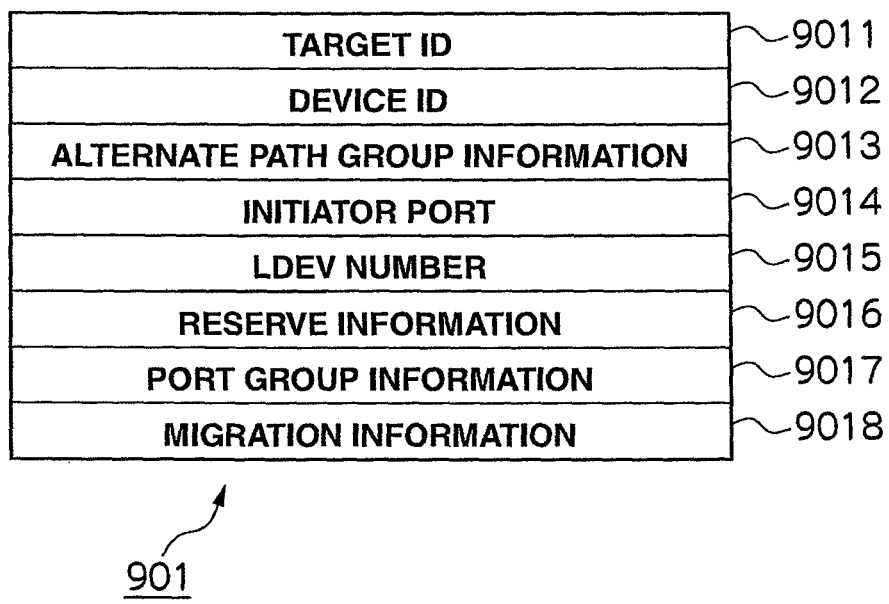
FIG. 5 is a schematic showing LU configuration control information of the first embodiment.

The LU configuration control information 901 is configuration control information for logical units LU the host apparatus 2 is capable of recognizing. As shown in FIG. 5, the configuration control information 901 is configured from a target port ID 9011 for identifying the port ID of the host apparatus 2 as with, for example, a WWN (World Wide Name), a device ID 9012 for identifying logical units such as, for example, LUN's, alternate path group information 9013 that can alternate between volumes recognized by the host apparatus 2, initiator port ID 9014 for identifying the port ID of storage apparatus having a physical device, an LDEV number 9015 that is a device number for a logical device LDEV, reserve information 9016 that reserves logical units LU in such a manner that access from other initiators is not possible, port group information 9017 for groups of host apparatuses 2 where access authority is permitted, and migration information 9018 that identifies migration states of the logical units LU.

Figure 6:
FIG. 6 is a schematic showing LDEV configuration control information of the first embodiment.

The LDEV configuration control information 902 is configuration control information for the logical devices LDEV the virtual devices VDEV are mapped to. As shown in FIG. 6, the configuration control information 902 is configured from an LDEV number 9021 that is a device number for a logical device LDEV, capacity information 9022 indicating the capacity of the logical device LDEV, emulation type 9023 indicating the type of format for the logical unit LU, LDEV concatenation information 9024 indicating how many logical device LDEV's are combined to form the logical unit LU, security information 9025 indicating the read/write state of the data due to the logical device units, volume attribute information 9026 indicating whether the volume correlated to the logical device LDEV is a real volume or virtual volume, VDEV number 9027 that is a device number for a virtual device VDEV correlated with the logical device LDEV, and LBA information 9028 for within LDEV that is an LBA (Logical Block Address) within the virtual device VDEV.

Of the LDEV configuration information, the LDEV number is unique device information. Information for a global LDEV number indicating correlation of the LDEV number to a device number for identifying a plurality of storage apparatuses 5A, 5B and an LDEV number, and a local LDEV number indicating an LDEV number within one storage is stored in the LDEV number.

Figure 7:
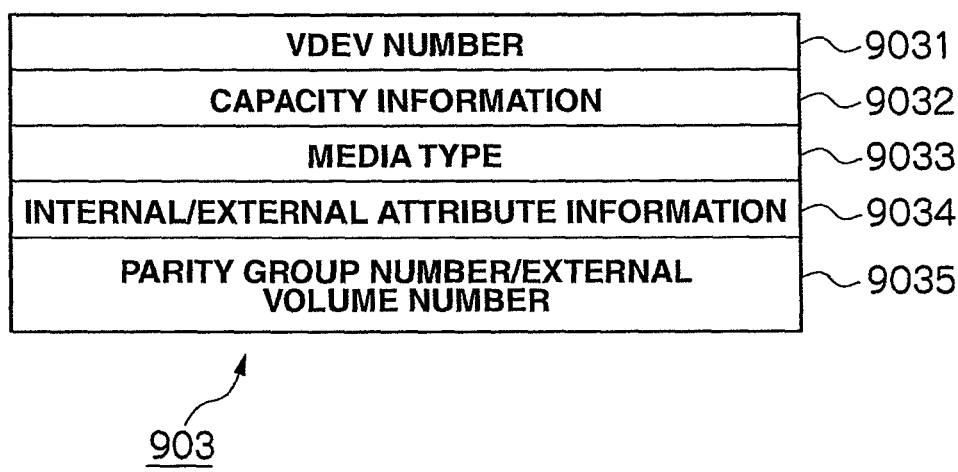
FIG. 7 is a schematic showing VDEV configuration control information of the first embodiment.

The VDEV configuration control information 903 is configuration control information for a virtual device VDEV mapping one or a plurality of physical devices 604. As shown in FIG. 7, the VDEV configuration control information 903 is configured from a VDEV number 9031 that is a device number for virtual device VDEV, capacity information 9032 indicating the capacity of the virtual device VDEV, a media type 9033 indicating the type of physical device (storage medium) correlated with the virtual device VDEV, internal/external attribute information 9034 indicating whether or not the physical device is connected to an internal device or is connected externally, and a parity group number/external volume number 9035 indicating a parity group number or external volume number of a physical device correlated to the virtual device VDEV.

Figure 8:
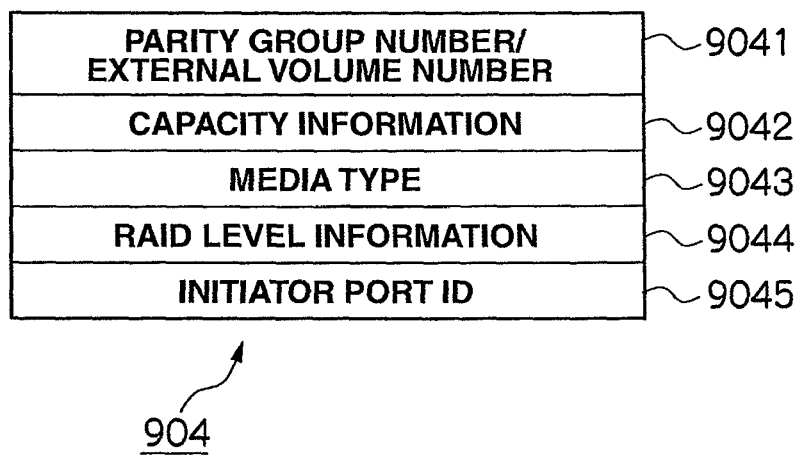
FIG. 8 is a schematic showing physical configuration control information of the first embodiment.

The physical configuration control information 904 is configuration control information for the physical device. In this embodiment, the physical device is the physical device 604 for the external storage apparatus 6. The target that is the physical device depends on the connection method of the storage apparatus in the storage system. As shown in FIG. 8, the physical configuration control information 904 is configured from a parity group number/external volume number 9041 indicating a parity group number of a physical device or the number of an external volume correlating to the virtual device VDEV, capacity information 9042 indicating the capacity of the physical device, a media type 9043 indicating the type of physical device, RAID level information 9044 indicating the RAID level of the physical device, and an initiator port ID 9045 identifying the port ID of the storage apparatus in possession of the physical device.

Editing configuration control information 906 is configuration control information for the migration source storage apparatus 5A that are setting conditions collected for migration destination storage apparatus 5B. The LU configuration control information for after editing, the LDEV configuration control information, the VDEV configuration control information, and the physical configuration control information are saved in the editing configuration control information 906.

A description is given of memory 703A of the management terminal 7A but as the configuration is also the same for the memory of management terminals 7B, 7C (not shown) and a description is therefore omitted.

(1-3-2) Setting Procedure for Migration Function

Next, a description is given of an operating procedure relating to a migration function with reference to each of the types of configuration control information described above.

Here, a description is given of the operating procedure for migrating a storage apparatus by mapping a logical unit LUa of a migration source at the migration source storage apparatus 5A to a logical unit LUb of a migration destination of migration destination storage apparatus 5B.

Further, in this embodiment, the operation procedure described below is for a migration source storage apparatus 5A that is an old model storage apparatus and a migration destination storage apparatus 5B that is a new model storage apparatus.

An alternate path program 208 is stored in the host apparatus 2. This alternate path is a redundant path for inputting and outputting data to and from the host apparatus 2.

Figure 9:
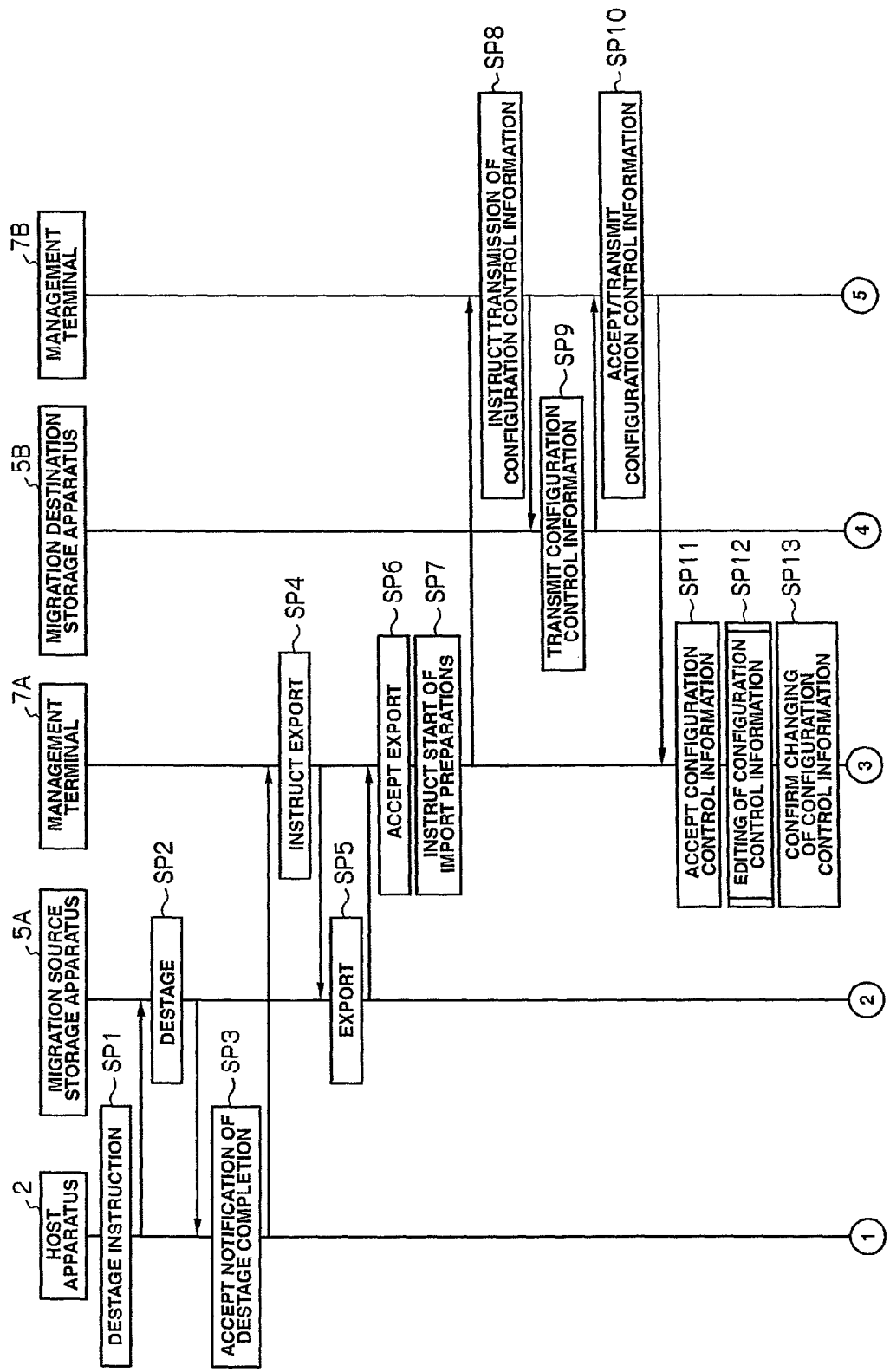
FIG. 9 is a sequence illustrating a migration function of the first embodiment.

Specifically, as shown in FIG. 9, the host apparatus 2 instructs destaging to the migration source storage apparatus 5A in such a manner that all of the data temporarily held in the disk cache 504A is destaged to the external volume PLU of the external storage apparatus 6 (SP1).

Figure 12:
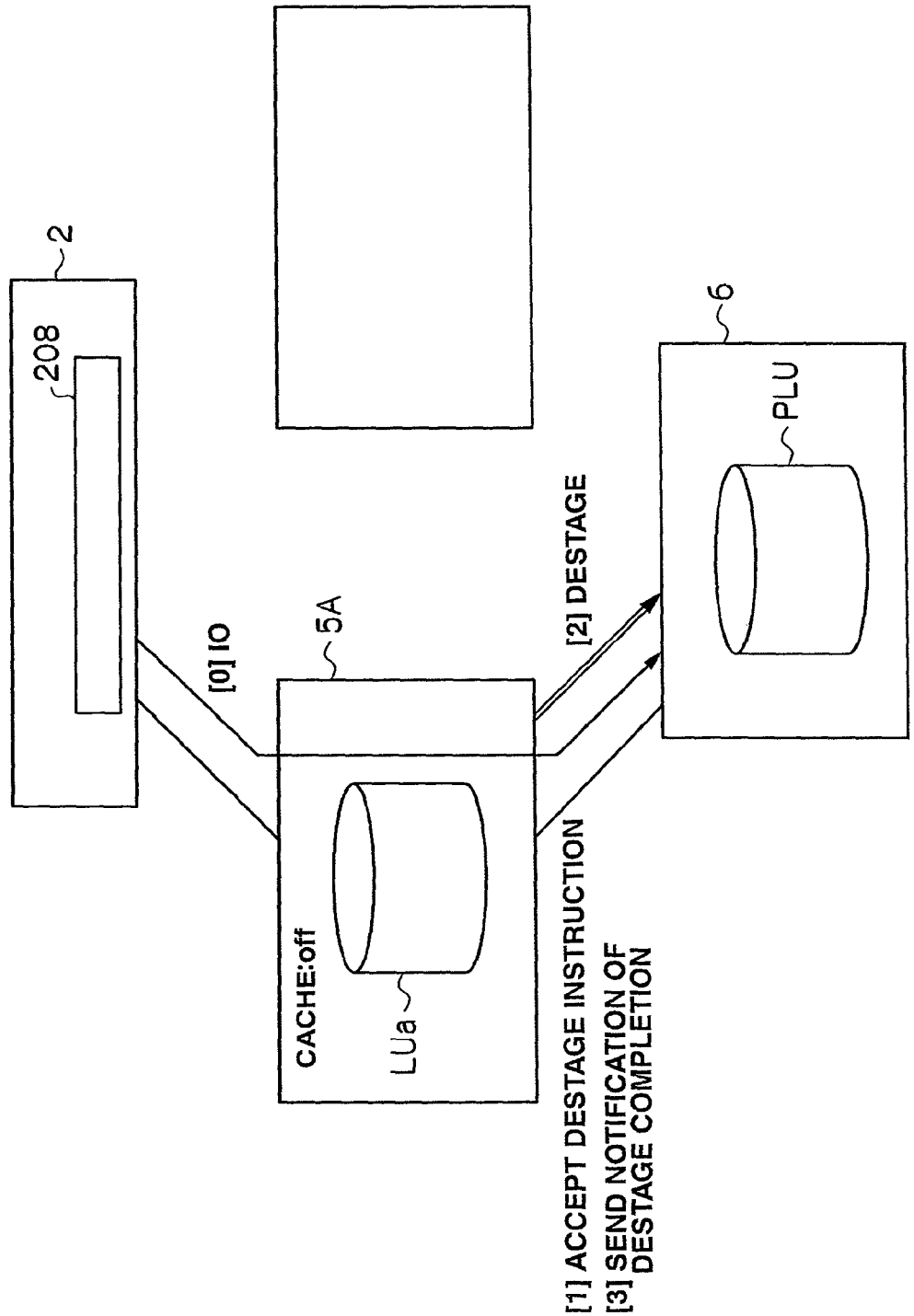
FIG. 12 is an outline view illustrating a migration function of the first embodiment.

At this time, as shown in FIG. 12, the host apparatus 2 carries out input and output of data to and from the external storage apparatus 6 via the migration source storage apparatus 5A ([0]).

Upon receiving this instruction from the host apparatus 2, the migration source storage apparatus 5A carries out destaging (SP2), and sends notification of completion of destaging to the host apparatus 2.

As shown in FIG. 12, the migration source storage apparatus 5A receiving a destaging instruction from the host apparatus 2 carries out destaging after setting the disk cache 504A off, and performs notification of completion of destaging ([1] to [3]). It is also possible to destage dirty data of the write data from the host apparatus 2 without setting the disk cache 504A to off, and to leave the read data on the disk cache 504A as is. In this case, there is a read request from the host apparatus 2 after setting the disk cache 504A off, and in the event that there is read data within the disk cache 504A, the read data is read out from the disk cache 504A. When there is no read data in the disk cache 504A, read data may be read out from the external volume PLU.

Upon receiving notification of completion of destaging (SP3), the host apparatus 2 instructs the management terminal 7A to read out and export various most recent configuration control information stored in the migration source storage apparatus 5A from the memory 503A (SP4).

Here, "export" refers to reading out of various most recent configuration control information stored in the migration source storage apparatus 5A from the memory 503A.

Figure 13:
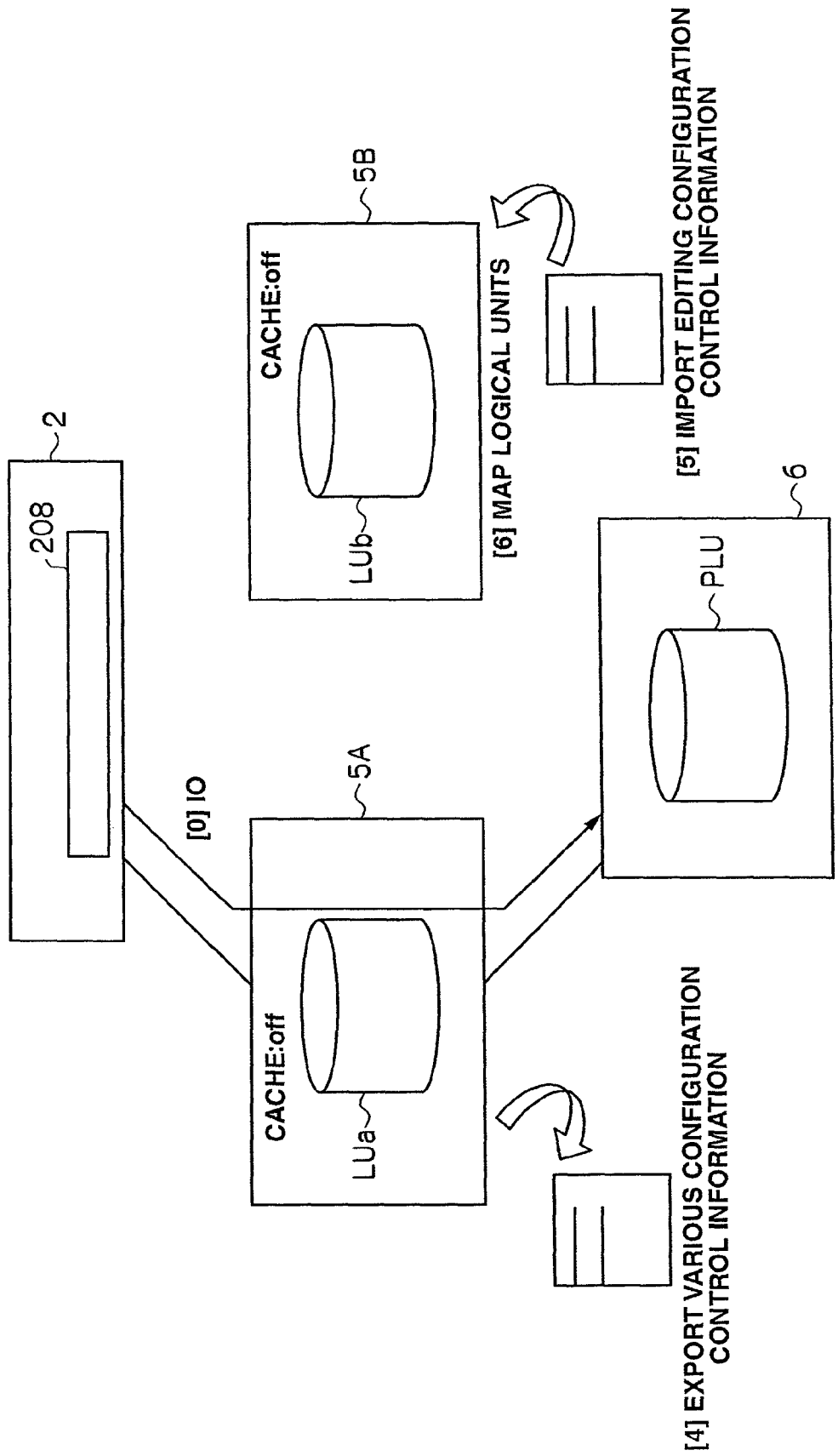
FIG. 13 is a further outline view illustrating a migration function of the first embodiment.

Upon receiving an export instruction, the management terminal 7A exports (reads out) various most recent configuration control information from the memory 503A (SP5), and receives each type of exported configuration control information (SP6). This situation is shown in FIG. 13 ([4]). At this time, input and output of data between the external storage apparatus 6 is carried out via the host apparatus 2 and the migration source storage apparatus 5A ([0]).

The management terminal 7A then instructs the management terminal 7B to start preparations for importing in order to import each type of configuration control information for the migration source storage apparatus 5A to the migration destination storage apparatus 5B (SP7).

Here, "import" refers to saving editing configuration control information that is various most recent configuration control information saved in the migration source storage apparatus 5A edited in the migration destination storage apparatus 5B or the memory 503B of management terminal 7B (memory of the management terminal 7B is not shown in the drawings).

Upon receiving an import preparation start instruction, the management terminal 7B instructs sending of various most recent configuration control information within the memory 503B of the migration destination storage apparatus 5B to the migration destination storage apparatus 5B (SP8).

Upon receiving this instruction from the management terminal 7B, the migration destination storage apparatus 5B sends various most recent configuration control information within the memory 503B to the management terminal 7A (SP9).

Upon receiving each type of configuration control information for the migration destination storage apparatus 5B from the management terminal (SP10), the management terminal 7A compares each type of configuration control information for the migration source storage apparatus 5A and each type of configuration control information for the migration destination storage apparatus 5B, and edits the configuration control information so that each type of configuration control information of the migration source storage apparatus 5A matches with the settings for the migration destination storage apparatus 5B (SP11). The details of editing processing carried out by this management terminal 7A are described in the following.

The management terminal 7A then confirms the presence or absence of changes in various configuration control information for the migration destination storage apparatus 5B (SP13). At this time, in the event that the management terminal 7A determines that a change in each type of configuration control information for the migration destination storage apparatus 5B is present, step SP7 is again returned to.

Figure 10:
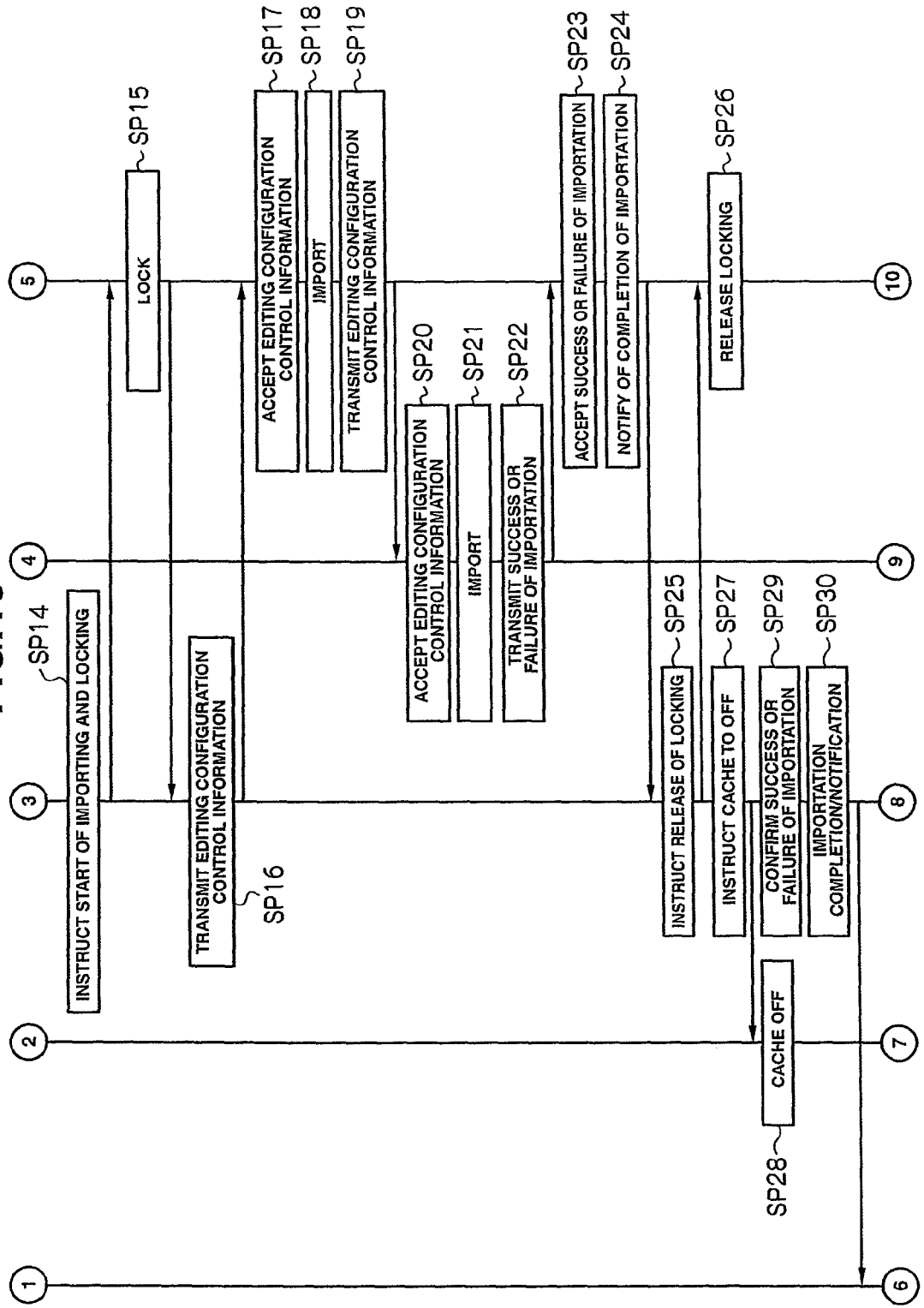
FIG. 10 is a further sequence illustrating a migration function of the first embodiment.
Figure 11:
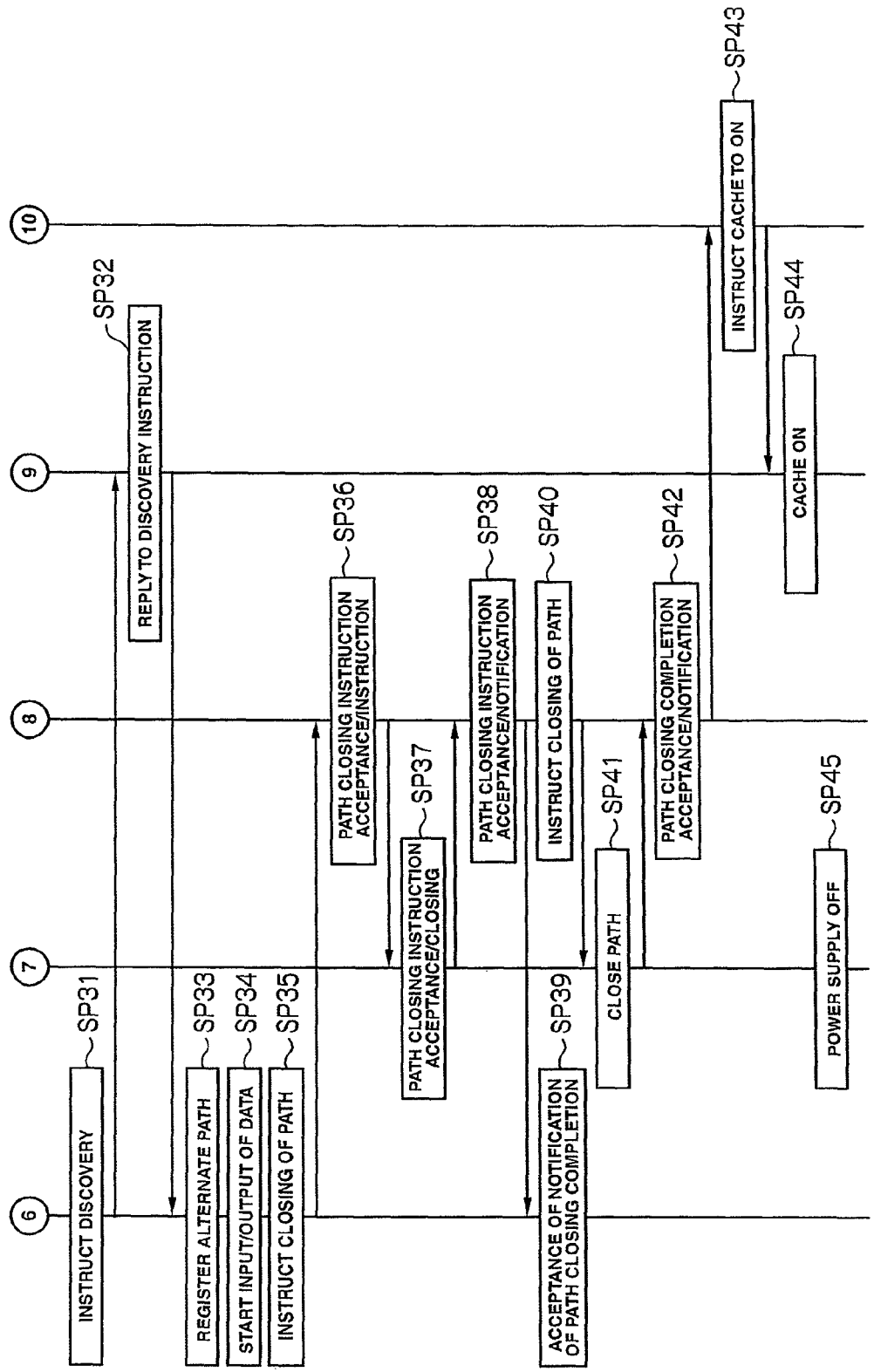
FIG. 11 is another sequence illustrating a migration function of the first embodiment.

As shown in FIG. 10, the management terminal 7A then starts to import the editing configuration control information 906 to the migration destination storage apparatus 5B (SP14). At the same time, the management terminal 7A instructs locking at the management terminal 7B in such a manner that changing of various configuration control information of the migration destination storage apparatus 5B from the other management terminal 7C does not take place (SP14).

When the locking instruction is received from the management terminal 7A, the management terminal 7B replies to the locking instruction and performs locking in such a manner that changing of various configuration control information of the migration destination storage apparatus 5B is not carried out (SP15). In the event that it is determined that it is not possible to lock the management terminal 7B, after transmission of an indication to this effect to the management terminal 7A, the management terminal 7A again returns to the step SP7.

When it is confirmed that the management terminal 7B has replied to the locking instruction, the management terminal 7A sends editing configuration control information to the management terminal 7B (SP16).

When the editing configuration control information sent from the management terminal 7A is received (SP17), the management terminal 7B imports the editing configuration control information to memory (not shown) within the management terminal 7B (SP18). At the same time, the management terminal 7B sends editing configuration control information to the migration destination storage apparatus 5B (SP19).

When editing configuration control information sent from the management terminal 7B is received (SP20), the migration destination storage apparatus 5B carries out processing to import the editing configuration control information to the memory 503B within the migration destination storage apparatus 5B (SP21). At this time, logical units LUb to which the logical units LUa within the migration destination storage apparatus 5B are mapped are set. Further, the disk cache 504B of the migration destination storage apparatus 5B is registered as using an off setting. This situation is shown in FIG. 13 ([5], [6]).

The migration destination storage apparatus 5B then sends the success or failure of the import processing to the management terminal 7B (SP22).

The management terminal 7B receives the success or failure of the import processing (SP23), and sends notification of completion of importing indicating the receipt of the success or failure of the import processing to the management terminal 7A (SP24).

In doing so, the management terminal 7A instructs lock releasing to the management terminal 7B (SP25). The management terminal 7B the carries out lock releasing (SP26).

The management terminal 7A instructs the migration source storage apparatus 5A to cache off in such a manner that the setting for the disk cache 504A goes from on to off (SP27). The migration destination storage apparatus 5A receiving this instruction then sets the settings for the disk cache 504A to off (SP28).

The management terminal 7A then confirms the success or failure of import processing using import completion notification sent from the management terminal 7B (SP29). The management terminal 7A then returns to step SP7 in the event that it is confirmed that import processing for the migration destination storage apparatus 5B has failed.

Figure 14:
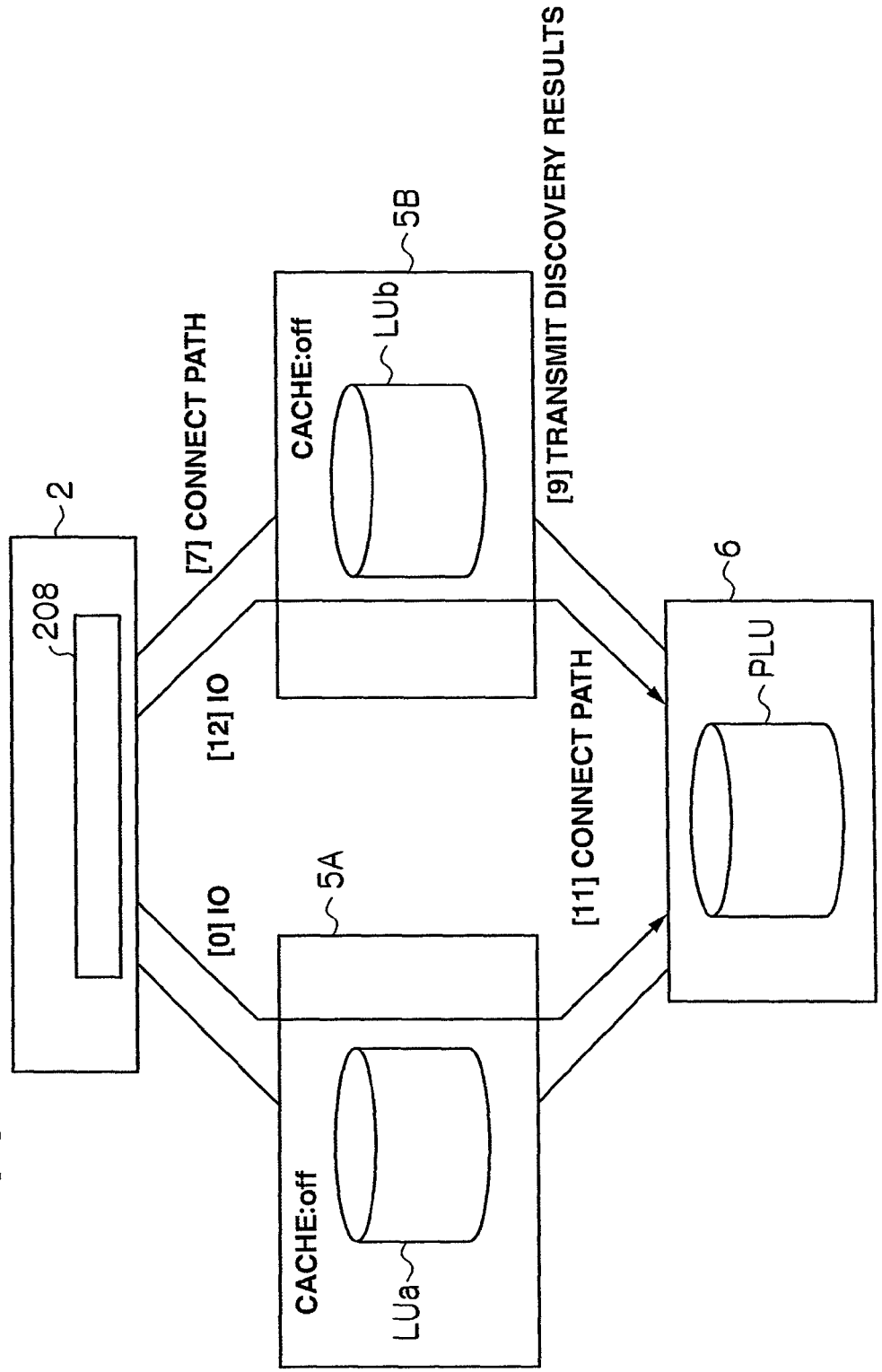
FIG. 14 is another outline view illustrating a migration function of the first embodiment.

In the event that import processing for the migration destination storage apparatus 5B is confirmed to have been successful, the management terminal 7A completes import processing and simultaneously notifies the host apparatus 2 to the effect that import processing is complete (SP30). At this time, as shown in FIG. 14, a path is connected between the host apparatus 2 and the migration destination storage apparatus 5B.

The host apparatus 2 then instructs discovery to all of the logical units within the storage system 1 in order to search and retrieve the same logical units as for the logical units LUa of the migration source storage apparatus 5A (SP31). The situation at this time is shown in FIG. 14 ([8]). This instruction may also be carried out on the host apparatus 2 by the management server 3 or user host. At this time, input and output of data between the external storage apparatus 6 is carried out via the host apparatus 2 and the migration source storage apparatus 5A ([0]).

As the logical unit LUb of the migration destination storage device 5B is the same as the logical unit LUa of the migration source storage device 5A, the migration destination storage device 5B replies to the discovery instruction from the host apparatus 2, and gives a reply to the effect that this is the same as the logical unit LUa of the migration source storage apparatus 5A to the host apparatus 2 (SP32). The situation at this time is shown in FIG. ([9]). At this time, input and output of data between the external storage apparatus 6 is carried out via the host apparatus 2 and the migration source storage apparatus 5A ([0]).

When it is confirmed by the host apparatus 2 that the logical unit LUa of the migration source storage apparatus 5A and the logical unit LUb of the migration destination storage apparatus 5B are the same, the migration destination storage apparatus 5B determines that switching to the alternate storage apparatus of the migration source storage apparatus 5A is possible, and registers an alternate path based on the alternate path program (SP33). At this time, as shown in FIG. 14, the host apparatus 2 carries out setting so that the connection path between the host apparatus 2 and the migration destination storage apparatus 5B is the alternate path for between the host apparatus 2 and the migration source storage apparatus 5A ([10]). After this, the management terminal 7B connects a path between the migration destination storage apparatus 5B and the external storage apparatus 6 ([11]).

The host apparatus 2 then also starts input and output of data to and from the migration destination storage apparatus 5B registering the alternate path (SP34). Input and output of data is carried out alternately by the migration source storage apparatus 5A and the migration destination storage apparatus 5B taking into consideration the load of the storage system 1. The situation at this time is shown in FIG. 14 ([0], [12]).

The disk cache 405B of the disk cache 504A of the migration source storage apparatus 5A and the disk cache 504B of the migration destination storage apparatus 5B is put to cache off. Loss of data therefore does not occur because there is no response to the host apparatus 2 until the data from the host apparatus 2 is written to the external volume PLU.

The host apparatus 2 then gives a closing instruction to close the path connecting the migration source storage apparatus 5A and the host apparatus 2 to the management terminal 7A (SP35).

When the closing instruction is received from the host apparatus 2, the management terminal 7A instructs closure to the migration source storage apparatus 5A (SP36).

Figure 15:
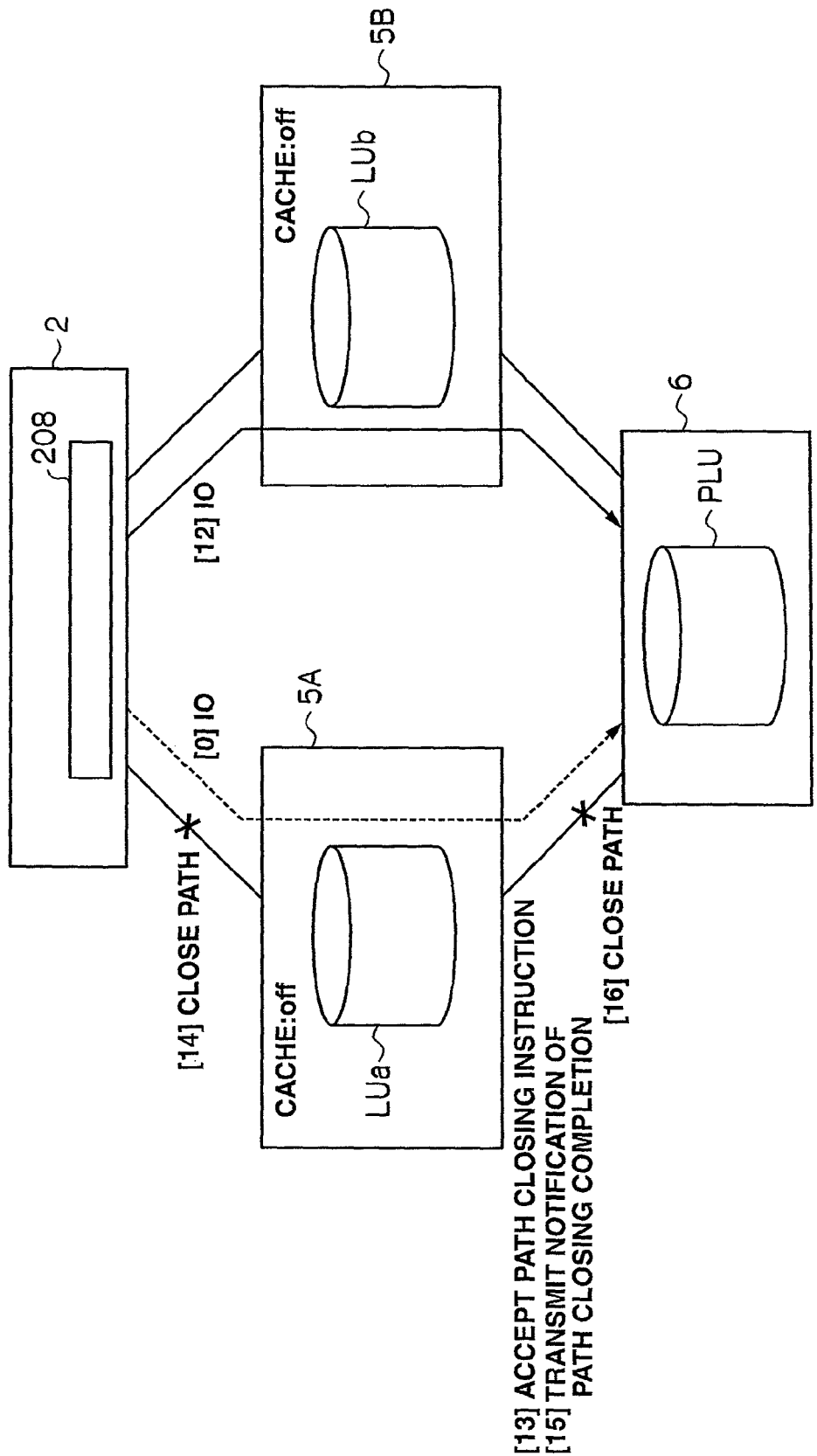
FIG. 15 is a further outline view illustrating a migration function of the first embodiment.
Figure 16:
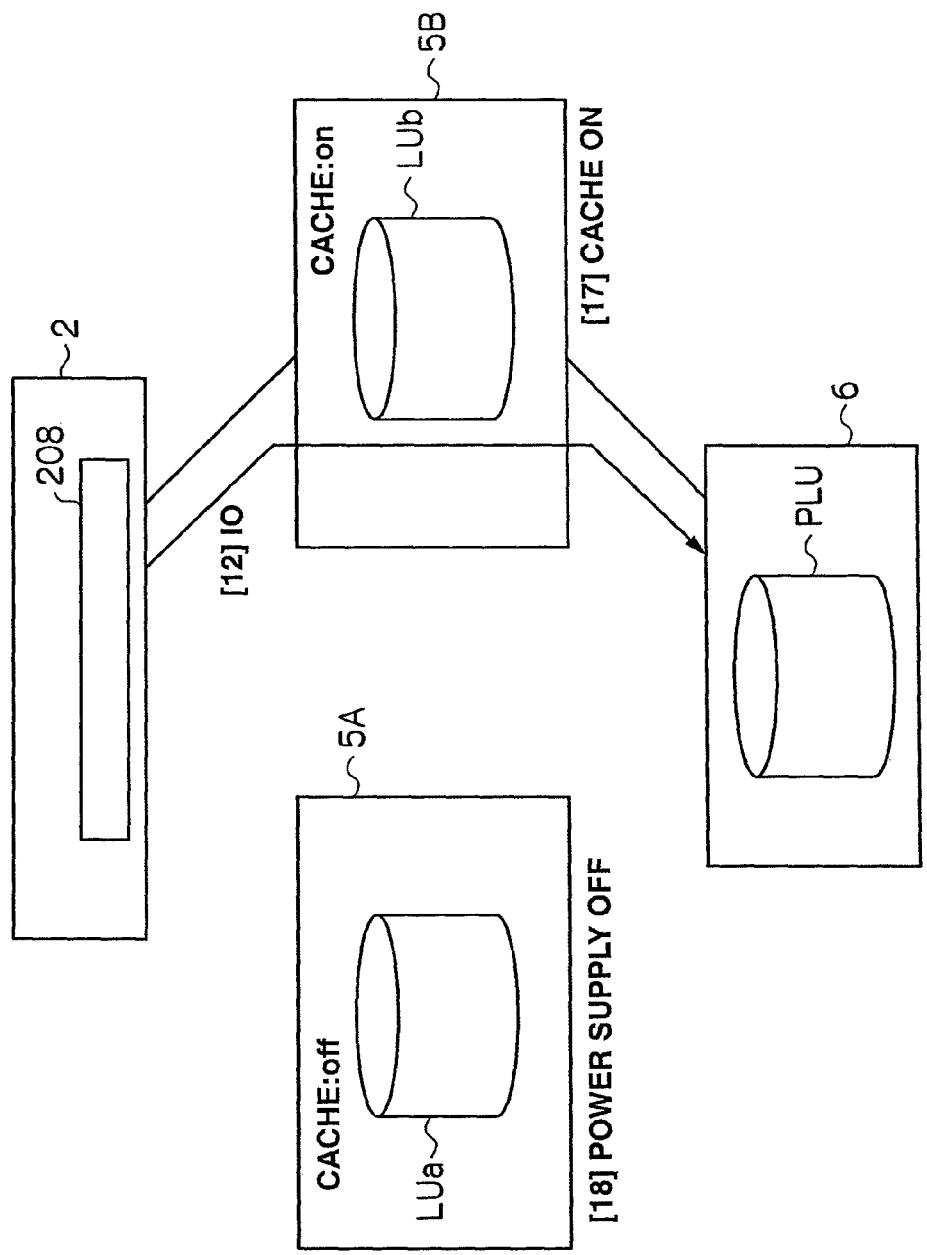
FIG. 16 is a still further outline view illustrating a migration function of the first embodiment.
Figure 17:
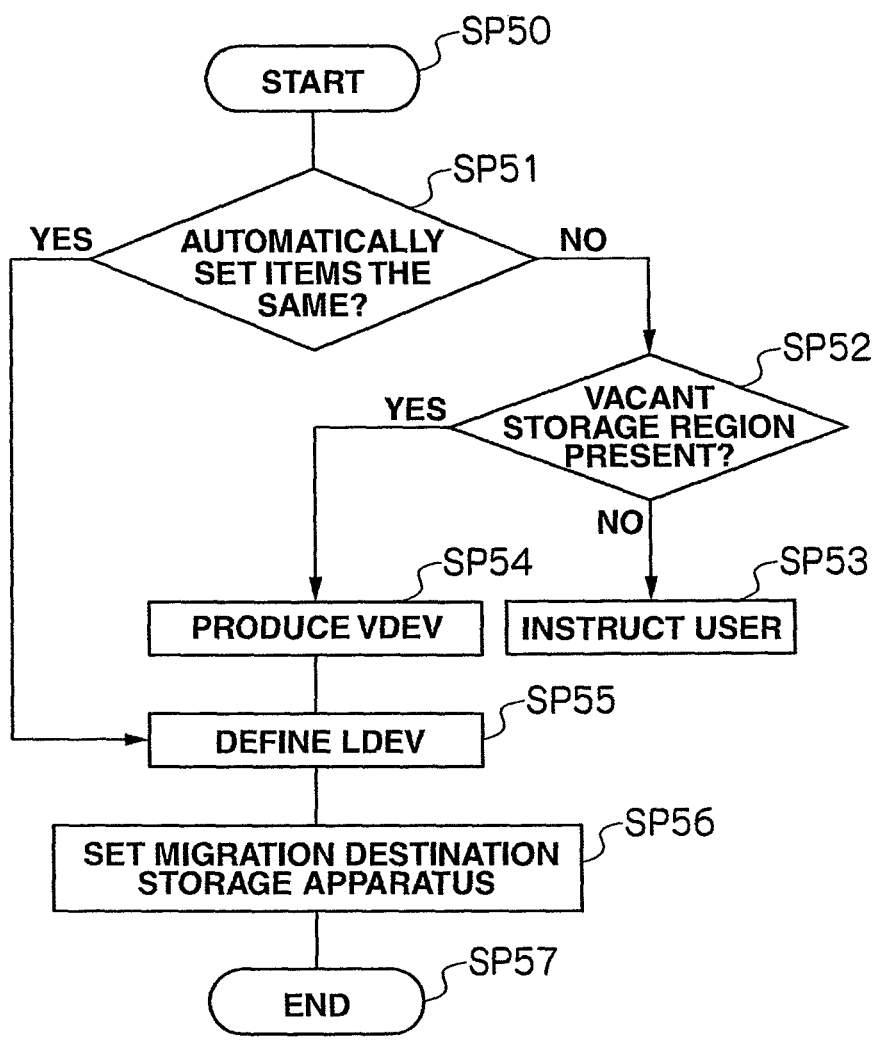
FIG. 17 is a flowchart for editing configuration control information of the first embodiment.
Figure 18:
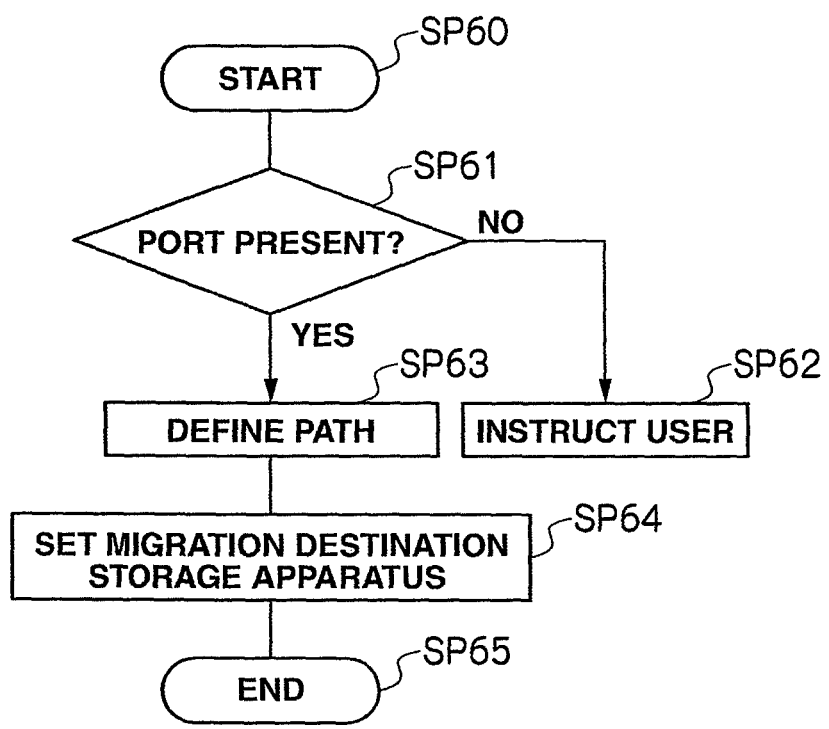
FIG. 18 is a further flowchart for editing configuration control information of the first embodiment.

Upon receiving the closing instruction from the management terminal 7A, the migration source storage apparatus 5A closes the path connecting the migration source storage apparatus 5A and the host apparatus 2 (SP37) and notifies the management terminal 7A that closing of the path is complete. The situation at this time is shown in FIGS. 15 ([13] to [15]). At this time, on the one hand, input and output of data to and from the external storage apparatus 6 via the host apparatus 2 and the migration source storage apparatus 5A is stopped ([0]), while input and output of data to and from the external storage apparatus 6 via the host apparatus 2 and the migration destination storage apparatus 5B is continued ([12]).

When notification to the effect that the path has been closed is received, the management terminal 7A notifies the host apparatus 2 to the effect that closing of the path is complete (SP38).

The host apparatus 2 then receives notification to the effect that closing of the path is complete from the management terminal 7A (SP39).

Continuing on, the management terminal 7A instructs the migration source storage apparatus 5A to close the path connecting the migration source storage apparatus 5A and the external storage apparatus 6 (SP40).

The migration source storage apparatus 5A receiving this instruction then closes a path connecting the migration source storage apparatus 5A and the external storage apparatus 6 (SP41), and the management terminal 7A is notified of this instruction. The situation at this time is shown in FIG. 15 ([16]). Input and output of data to and from the external storage apparatus 6 is carried out via the host apparatus 2 and the migration destination storage apparatus 5B ([12]).

The management terminal 7A receiving notification to the effect that the path between the migration source storage apparatus 5A and the external storage apparatus 6 is closed then notifies the management terminal 7B (SP42).

In doing so, the management terminal 7B instructs caching on to the migration destination storage apparatus 5B in such a manner that the setting for the disk cache 504B is changed from off to on (SP43).

The migration destination storage apparatus 5B then changes the setting for the disk cache 504B from off to on (SP44). The situation at this time is shown in FIG. 15 ([17]). Continuing on, input and output of data to and from the external storage apparatus 6 is carried out via the host apparatus 2 and the migration destination storage apparatus 5B ([12]).

On the other hand, the migration source storage apparatus 5A puts the power supply off after releasing the settings for the path for between the migration source storage apparatus 5A and the host apparatus 2 and the setting for the path with the external storage apparatus 6 (SP45) and this operation procedure is complete. The situation at this time is shown in FIG. ([18]). Continuing on, input and output of data to and from the external storage apparatus 6 is carried out via the host apparatus 2 and the migration destination storage apparatus 5B ([12]).

As migration is carried out in units of logical units, it is possible to recognize the input and output of data from the host apparatus 2 towards the same logical unit. It is therefore possible to carry out migration without stopping input and output of data from the host apparatus 2.

(1-3-3) Processing for Editing Configuration Control Information

Processing for editing configuration control information in step SP12 of the operating procedure described above is described. The management terminal 7A executes editing processing for configuration control information based on the editing control information program 907. Processing for editing configuration control information may also be carried out by the management server 3.

(1-3-3-1) Definition of Logical Device

First, a description is given of processing where the management terminal 7A defines the logical device LDEV in line with the configuration control information of the migration destination storage apparatus 5B.

Specifically, when the various configuration control information for the migration destination storage apparatus 5B is received from the management terminal 7B, the CPU 702A of the management terminal 7A starts configuration control information editing processing (SP50).

Next, the CPU 702A of the management terminal 7A compares the various configuration control information of the migration source storage apparatus 5A and the various configuration control information of the migration destination storage apparatus 5B, and determines whether or not automatically set items are the same (SP51).

Here, "automatically set items" are items that are set automatically as a result of editing. In this embodiment, automatically set items are the capacity of the logical device LDEV, the RAID level and the media type. Further, "media type" refers to the type of physical device such as whether the physical device storing the data is a hard disk drive or non-volatile semiconductor memory such as flash memory, etc.

When the automatically set items are determined to be the same (SP51: YES), the CPU 702A of the management terminal 7A proceeds to step SP55.

On the other hand, when the automatically set items are determined not to be the same (SP51: NO), the CPU 702A of the management terminal 7A determines that migration to within the migration destination storage apparatus is not possible, and it is determined whether or not a vacant storage region is present in the next external storage apparatus 6 (SP52). This is, in order to finally make a storage region the logical units LUa can be moved to within the migration destination storage apparatus 5B. The empty storage regions may be on the physical disk 604 or may be on the external volume PLU.

When it is determined that there is no empty storage region at the external storage apparatus 6 (SP52: NO), the CPU 702A of the management terminal 7A awaits instruction from the user (SP53).

On the other hand, when it is determined that there is an empty storage region in the external storage apparatus 6 (SP52: YES), the CPU 702A of the management terminal 7A makes a virtual device VDEV from this empty storage region (SP54).

Continuing on, the CPU 702A of the management terminal 7A defines a logical device LDEV (SP55). At this time, the CPU 702A of the management terminal 7A makes a virtual device VDEV, and in the event that a logical device LDEV is defined from the virtual device VDEV, the RAID level and type of disk are also set.

When the defined logical device LDEV is set to the migration destination storage apparatus 5B (SP56), the CPU 702A of the management terminal 7A ends this processing (SP57).

The automatically set items set based on this processing are the LDEV capacity information for within the editing configuration control information 906, the RAID level information, and the media type saved to.

(1-3-3-1) Path Definition

The description now continues for processing where the management terminal 7A defines a path in line with the configuration control information of the migration destination storage apparatus 5B. The management terminal 7A executes editing processing for configuration control information based on the editing control information program 907.

First, when the logical device LDEV is set to the migration destination storage apparatus 5B, the CPU 702A of the management terminal 7A starts this processing (SP60).

The CPU 702A of this management terminal 7A then determines whether or not there is a port 501 B where path definition is possible at the migration destination storage apparatus 5B (SP61).

When it is determined by the CPU 702A of the management terminal 7A that there is no port 501 B where path definition is possible at the migration destination storage apparatus 5B (SP61: NO), instruction from the user is awaited (SP62).

On the other hand, in the event that it is determined that there is a port 501B where it is possible to define a path at the migration destination storage apparatus 5B (SP61: YES), the CPU 702A of the management terminal 7A defines a path for the migration destination storage apparatus 5B (SP63).

When the defined path is set at the port 501B of the migration destination storage apparatus 5B (SP64), the CPU 702A of the management terminal 7A ends this processing (SP65).

The automatically set items set based on this processing are then saved to the initiator port ID within the editing configuration control information 906.

As mapping is carried out in units of logical units with migration of the storage apparatus then taking place, it is possible to recognize the input and output of data from the host apparatus 2 towards the same logical unit. It is therefore possible to carry out migration of a storage apparatus without stopping input and output of data from the host apparatus 2.

(1-4) Effects of the First Embodiment

According to this embodiment, it is possible to migrate to an access destination of a host apparatus without having to stop the exchange of data between a host apparatus and a storage apparatus and while continuing the functions of the storage apparatus.

Moreover, according to this embodiment, it is possible to edit configuration control information without the mediation of a user in such a manner that configuration control information of a migration source storage apparatus is in line with settings of a migration destination storage apparatus, and this is also compatible with storage systems where a plurality of storage apparatuses where the environment such as setting conditions etc. are different are connected.

(2) Second Embodiment (2-1) Configuration of Storage System of a Second Embodiment Next, a storage system of a second embodiment is described in the following. In the second embodiment, portions corresponding to portions of the first embodiment are given the same numbers and are not described. Only portions that are different to the first embodiment are described in the description of the second embodiment.

As shown in FIG. 1, numeral 1' is the whole of a storage system of the second embodiment. This storage system 1' is configured in such a manner that host apparatus 2 is connected to the fibre channel switch 4, the fibre channel switch 4 is connected to a migration source storage apparatus 5'A, migration destination storage apparatus 5'B and external storage apparatus 6, the migration source storage apparatus 5'A, migration destination storage apparatus 5'B and external storage apparatus 6 are respectively connected to management terminals 7', and the host apparatus 2, management server 3, fibre channel switch 4 and respective management terminals 7' are connected to the network 8.

In the storage system 1' of this embodiment, migration source storage apparatus 5'A and migration destination storage apparatus 5'B are the same kind of storage apparatus. The management terminal 7'A manages the migration source storage apparatus 5'A, and the management terminal 7'B manages the migration destination storage apparatus 5'B.

(2-2) Migration Function Setting Procedure

Next a description is given of an operation procedure relating to the migration function of this embodiment.

Here, a description is given of an operation procedure where logical units LU'a of the migration source at migration source storage apparatus 5'A are mapped to logical units LU'b of the migration destination, and the storage apparatus is mapped from the migration source storage apparatus 5'A to the migration destination storage apparatus 5'B. An alternate path program 208 is stored in the host apparatus 2.

Figure 19:
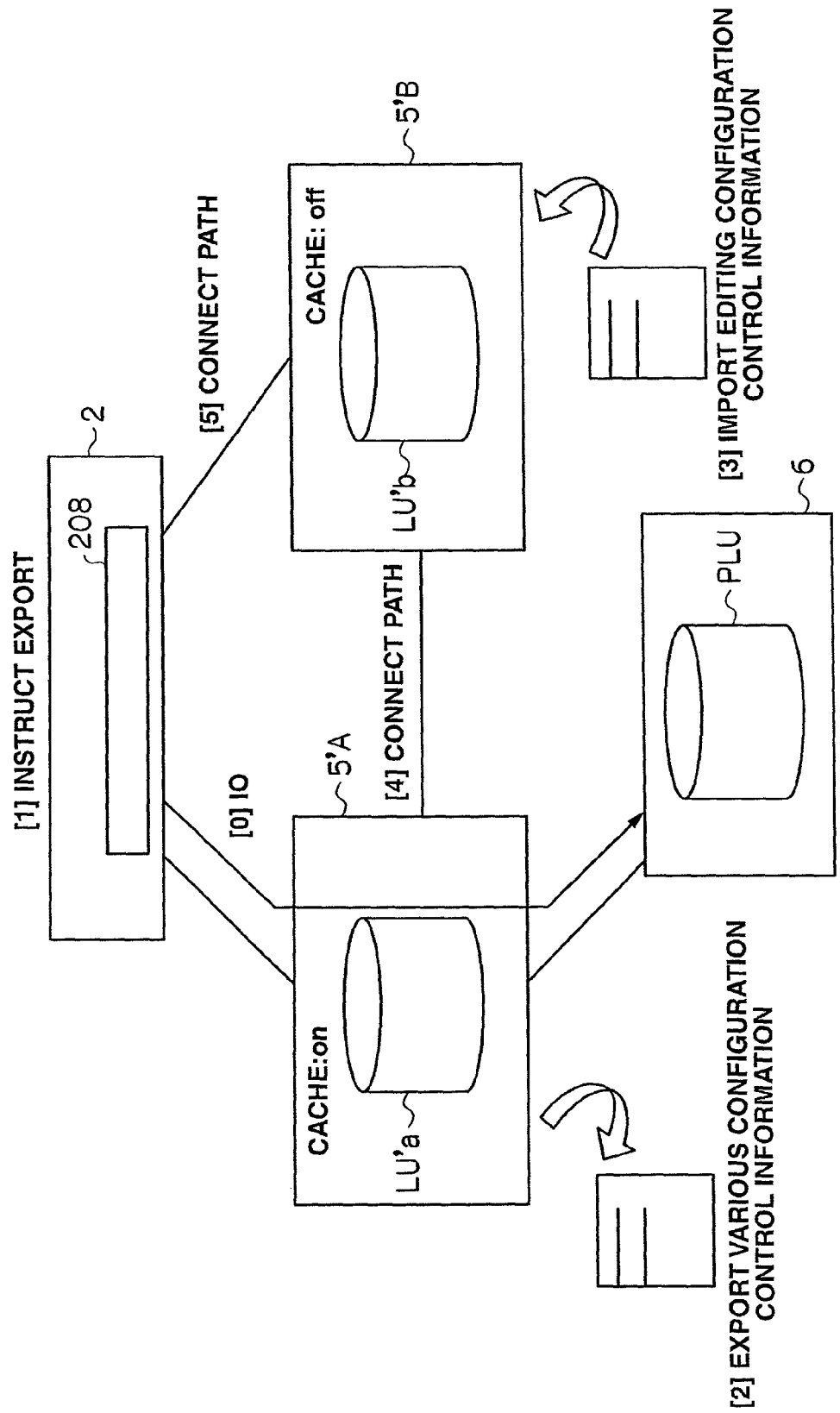
FIG. 19 is an outline view illustrating a migration function of a second embodiment.

Specifically, as shown in FIG. 19, input and output of data is carried out to and from the external volume PLU of the external storage apparatus 6 via the host apparatus 2 and the migration source storage apparatus 5'A ([0]).

First, the host apparatus 2 instructs exporting to the management terminal 7'A in such a manner that the most recent various configuration control information saved in the migration source storage apparatus 5'A is read from the memory 503'A ([1]).

Upon receiving an export instruction, the management terminal 7'A exports (reads out) various most recent configuration control information from the memory 503'A, and receives each type of exported configuration control information.

The management terminal 7'A then instructs the management terminal 7'B to start preparations for importing in order to import each type of configuration control information for the migration source storage apparatus 5'A to the migration destination storage apparatus 5'B.

Upon receiving an import preparation start instruction, the management terminal 7'B instructs sending of various most recent configuration control information within the memory 503'B of the migration destination storage apparatus 5'B to the migration destination storage apparatus 5'B.

Upon receiving this instruction from the management terminal 7'B, the migration destination storage apparatus 5'B sends various most recent configuration control information within the memory 503'B to the management terminal 7'A.

Upon receiving each type of configuration control information for the migration destination storage apparatus 5'B from the management terminal 7'B, the management terminal 7'A compares each type of configuration control information for the migration source storage apparatus 5'A and each type of configuration control information for the migration destination storage apparatus 5'B, and edits the configuration control information so that each type of configuration control information of the migration source storage apparatus 5'A matches with the settings for the migration destination storage apparatus 5'B. With regards to editing processing carried out by this management terminal 7'A, this embodiment is the same as the first embodiment and description of the editing processing is therefore omitted.

As shown in FIG. 19, the management terminal 7'A then starts to import the editing configuration control information 906 to the migration destination storage apparatus 5'B. At the same time, the management terminal 7'A instructs locking at the management terminal 7'B in such a manner that changing of various configuration control information of the migration destination storage apparatus 5'B from the other management terminal 7'C does not take place.

When the locking instruction is received from the management terminal 740 A, the management terminal 7'B replies to the locking instruction and performs locking in such a manner that changing of various configuration control information of the migration destination storage apparatus 5'B is not carried out.

When it is confirmed that the management terminal 7'B has replied to the locking instruction, the management terminal 7'A sends editing configuration control information to the management terminal 7'B.

When the editing configuration control information sent from the management terminal 7'A is received, the management terminal 7'B imports the editing configuration control information to memory (not shown) within the management terminal 7'B. At the same time, the management terminal TB sends editing configuration control information to the migration destination storage apparatus 5'B ([3]).

When editing configuration control information sent from the management terminal 7'B is received, the migration destination storage apparatus 5'B carries out processing to import the editing configuration control information to the memory 503'B within the migration destination storage apparatus 5'B. At this time, a logical unit LU'b is set within the migration destination storage apparatus 5'B. Further, the disk cache 504'B of the migration destination storage apparatus 5'B is registered using an off setting.

The migration destination storage apparatus 5'B then sends the success or failure of the import processing to the management terminal 7'B. The management terminal 7'B receives the success or failure of the import processing, and sends notification of completion of importing indicating the receipt of the success or failure of the import processing to the management terminal 7'A. In doing so, the management terminal 7'A instructs lock releasing to the management terminal 7'B. The management terminal 7'B the carries out lock releasing.

Next, as shown in FIG. 19, the management terminal 7'A connects a path between migration source storage apparatus 5'A and migration destination storage apparatus 5'B ([4]). At this time, input and output of data is carried out to and from the external volume PLU of the external storage apparatus 6 via the host apparatus 2 and the migration source storage apparatus 5'A ([0]).

Further, the management terminal 7'B connects a path between the migration destination storage apparatus 5'B and the host apparatus 2 ([5]). At this time, input and output of data is carried out to and from the external volume PLU of the external storage apparatus 6 via the host apparatus 2 and the migration source storage apparatus 5'A ([0]).

The host apparatus 2 then instructs discovery to all of the logical units within the storage system 1 in order to search and retrieve the same logical units as for the logical units LU'a of the migration source storage apparatus 5'A. This instruction may also be carried out on the host apparatus 2 by the management server 3 or user host.

The logical units LU'b of the migration destination storage apparatus 5'B are the same as the logical units LU'a of the migration source storage apparatus 5'A, and a reply to this effect is therefore returned to the host apparatus 2.

Figure 20:
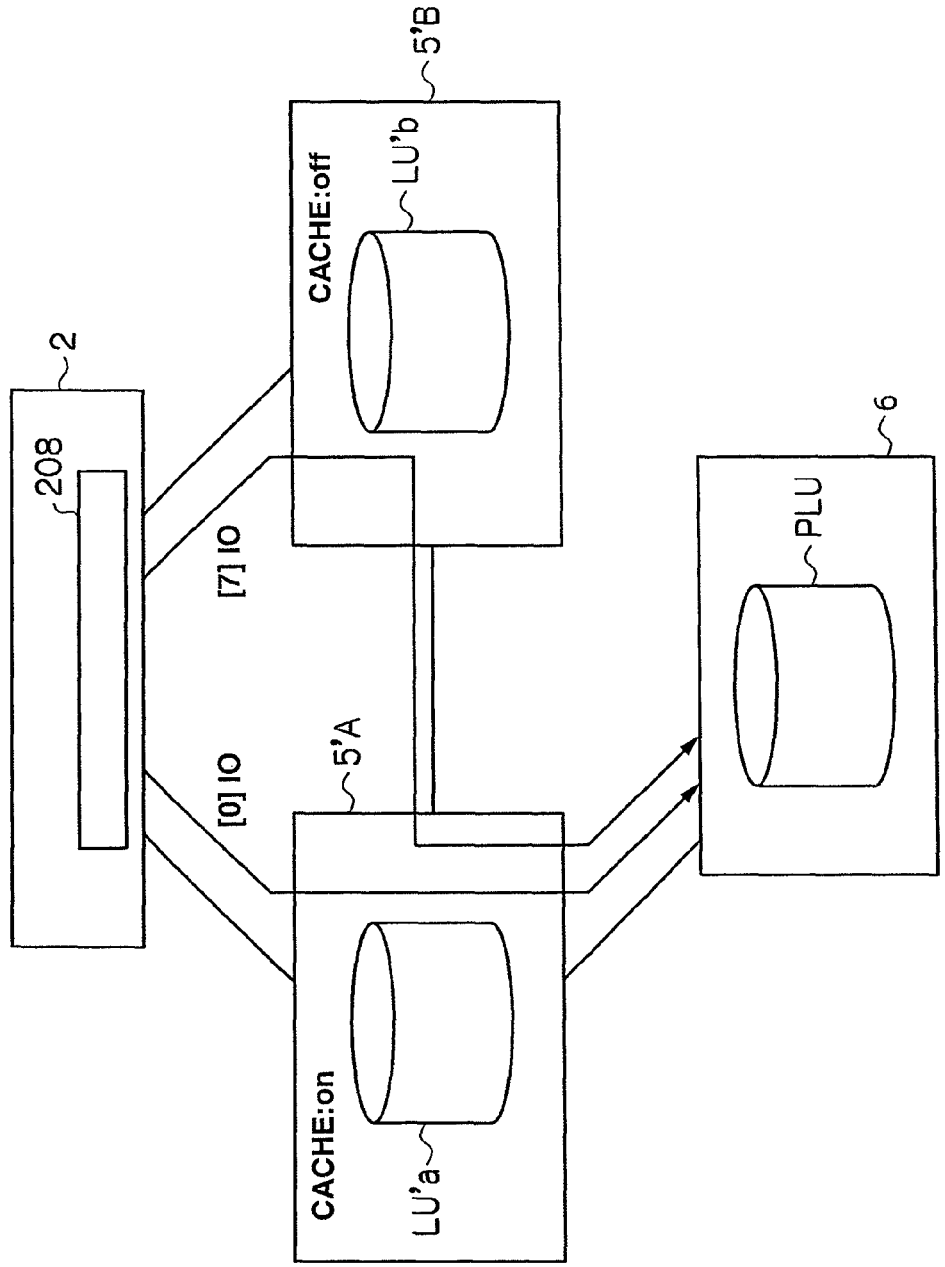
FIG. 20 is another outline view illustrating a migration function of the second embodiment.

As shown in FIG. 20, when it is confirmed that the logical units LU'a of the migration source storage apparatus 5'A and the logical units LU'b of the migration destination storage apparatus 5'B are the same, the host apparatus 2 sets an alternate path based on the alternate path program 208 ([6]). At this time, input and output of data is carried out to and from the external volume PLU of the external storage apparatus 6 via the host apparatus 2 and the migration source storage apparatus 5'A ([0]). At this time, rather than the disk cache 504'A being set to off, only the read data is made to remain. Further, on the other hand, when the read data remains within the disk cache 504'B, in order to prevent a situation where the read data is once again written into the disk cache 504'B so that, in the event that data is read again from the disk cache 504'B so that it is no longer possible to obtain consistency for the data, the disk cache 504'B has to be set completely off.

The host apparatus 2 then also starts input and output of data to and from the migration destination storage apparatus 5'B set with the alternate path ([7]). At this time, in order to set the disk cache 504'B of the migration destination storage apparatus 5'B to off, the input/output of data flows via the host apparatus 2, migration source storage apparatus 5'A, and on to the migration destination storage apparatus 5'B, to and from the external storage apparatus 6 ([7]). Further, continuing on, input and output of data is carried out to and from the external volume PLU of the external storage apparatus 6 via the host apparatus 2 and the migration source storage apparatus 5'A ([0]). Input and output of data is carried out alternately via the migration source storage apparatus 5'A and the migration destination storage apparatus 5'B taking into consideration the load of the storage system 1.

Figure 21:
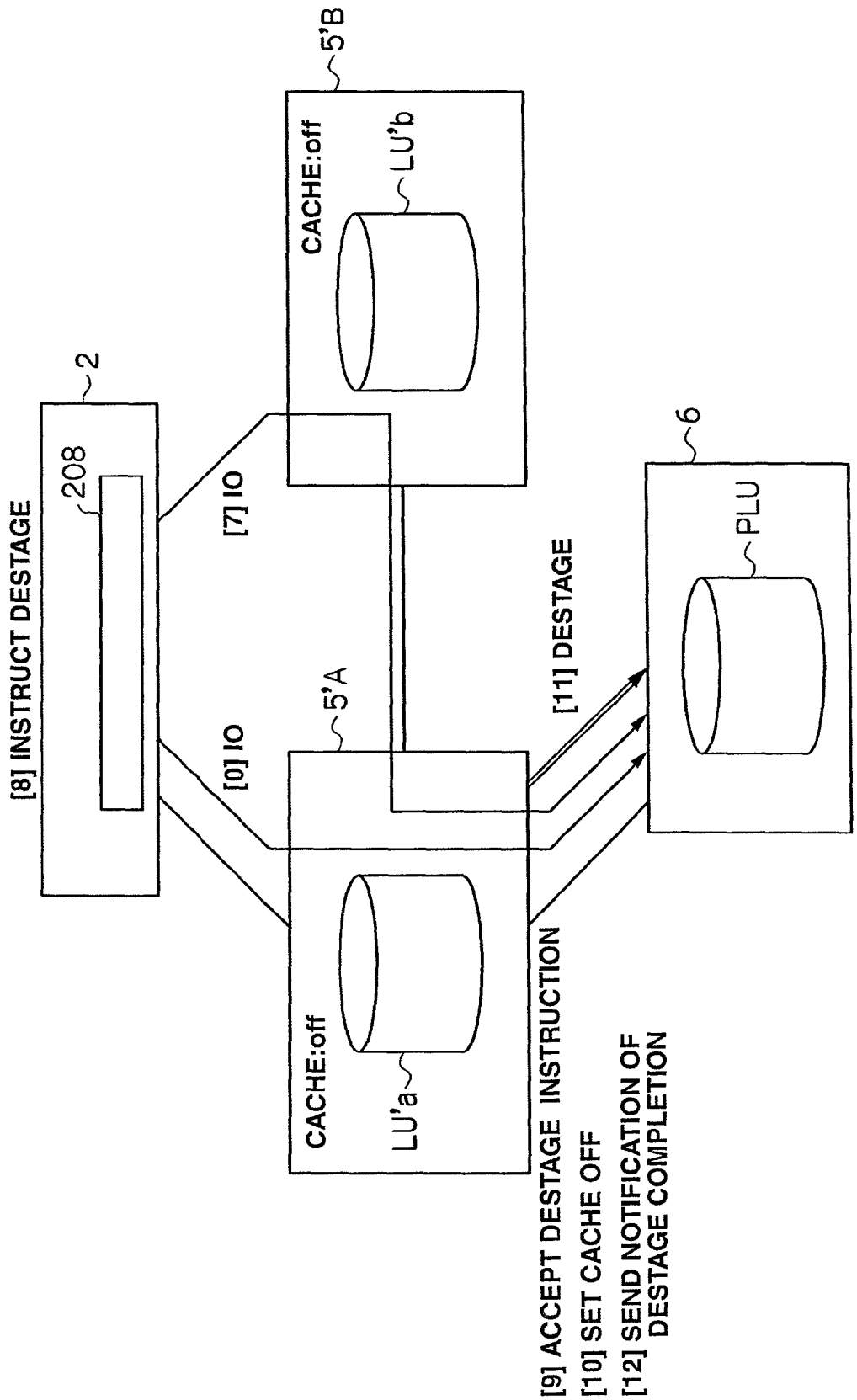
FIG. 21 is a further outline view illustrating a migration function of the second embodiment.

To continue, as shown in FIG. 21, the host apparatus 2 instructs destaging to the migration source storage apparatus 5'A in such a manner that all of the data temporarily held in the disk cache 504'A is destaged to the external volume PLU of the external storage apparatus 6 ([8]).

Upon receiving this instruction from the host apparatus 2, the migration source storage apparatus 5'A carries out destaging after setting the disk cache 504A to off, and sends notification of completion of destaging to the host apparatus 2 ([9] to [12]). At this time, input and output of data is carried out to and from the external volume PLU of the external storage apparatus 6 via the host apparatus 2 and the migration source storage apparatus 5'A ([0]). Further, input and output of data between the external storage apparatus 6 is carried out via the host apparatus 2, the migration source storage apparatus 5'A, and the migration destination storage apparatus 5'B ([7]).

Figure 22:
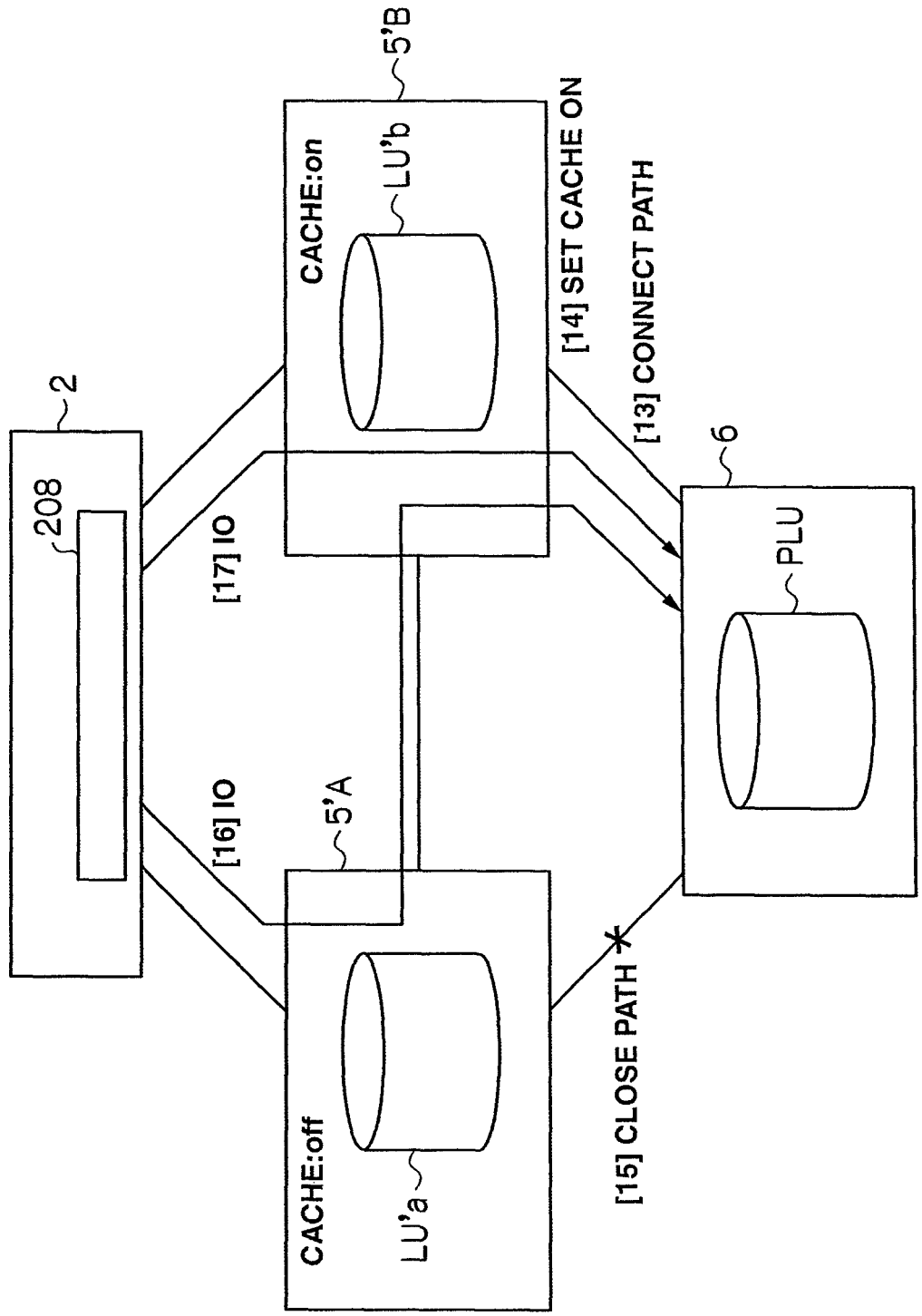
FIG. 22 is a still further outline view illustrating a migration function of the second embodiment.

Next, as shown in FIG. 22, the management terminal 7'B connects a path between the migration destination storage apparatus 5'B and the external storage apparatus 6 ([13]).

When a path is connected between the migration destination storage apparatus 5'B and the external storage apparatus 6, the migration destination storage apparatus 5'B sets the disk cache 504'B to on ([14]).

The migration source storage apparatus 5'A receiving the path close instruction from the management terminal 7'A then closes the path between the migration source storage apparatus 5'A and the external storage apparatus 6 ([15]).

At this time, the disk cache 504'A of the migration source storage apparatus 5'A is set to off, and the disk cache 504'A of the migration destination storage apparatus 5'B is set to on. Because of this, input and output of data takes place with the external storage apparatus 6 via the host apparatus 2 and the migration source storage apparatus 5'A, and via the migration destination storage apparatus 5'B, while on the other hand, interchanging takes place with the external storage apparatus 6 via the host apparatus 2 and the migration destination storage apparatus 5'B ([16], [17]).

Next, when a closing instruction is given to management terminal 7'A to close the path connecting the migration source storage apparatus 5'A and the host apparatus 2, the host apparatus 2 carries out this instruction to the migration source storage apparatus 5'A.

Figure 23:
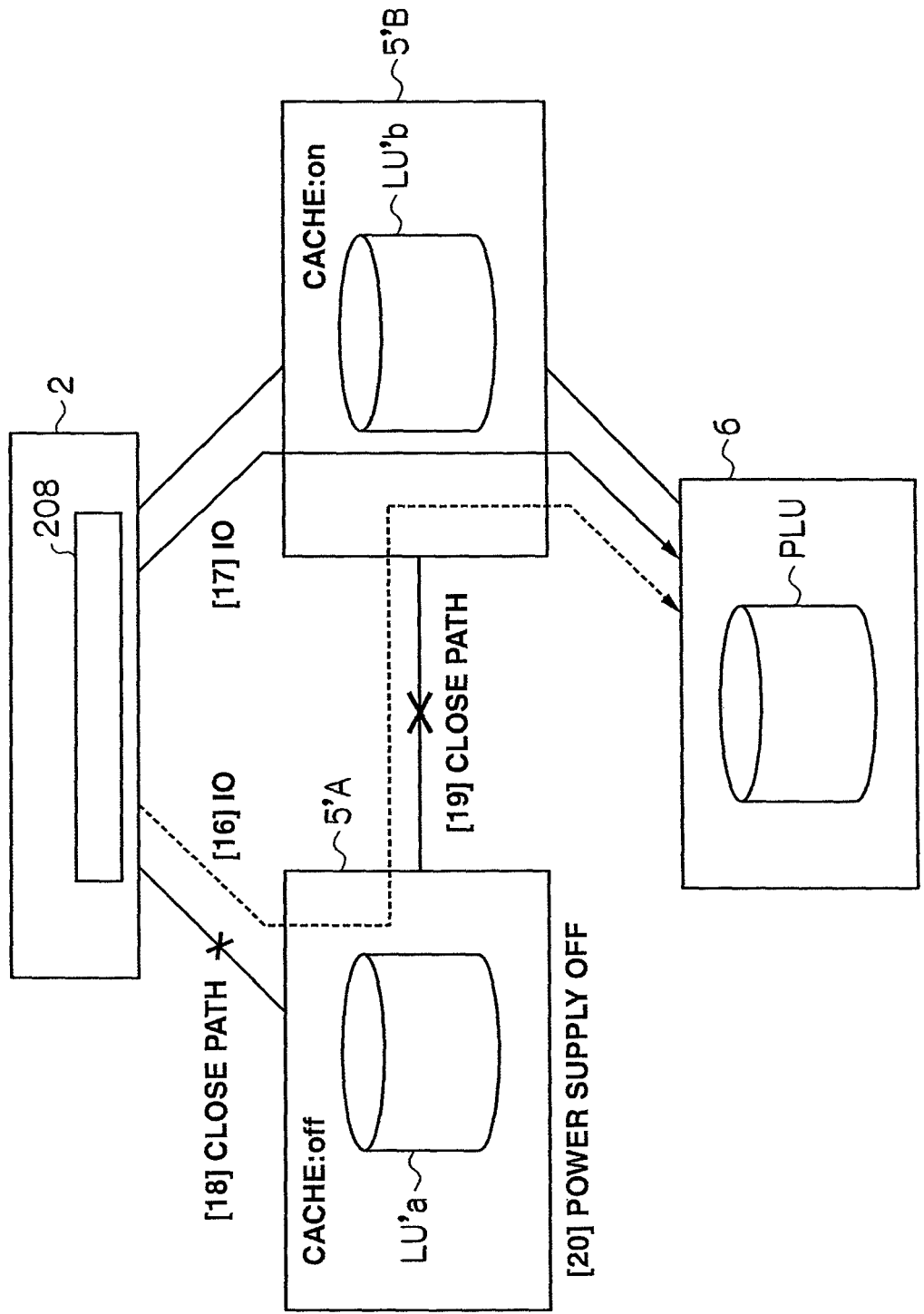
FIG. 23 is another outline view illustrating a migration function of the second embodiment.

As shown in FIG. 23, upon receiving the closing instruction from the management terminal 7'A, the migration source storage apparatus 5'A closes the path connecting the migration source storage apparatus 5'A and the host apparatus 2 and notifies the management terminal 7'A that closing of the path is complete ([18]).

Upon receiving notification to the effect that closing of the path is complete, the management terminal 7'A notifies the host apparatus 2 that closing of the path is complete, and the host apparatus 2 receives notification to the effect that closing of the path is complete from the management terminal 7'A.

Continuing on, the management terminal 7'A then instructs the migration source storage apparatus 5'A to close the path connecting the migration source storage apparatus 5'A and the migration destination storage apparatus 5'B.

As shown in FIG. 23, the migration source storage apparatus 5'A receiving this instruction then closes a path connecting the migration source storage apparatus 5'A and the migration destination storage apparatus 5'B, and the management terminal 7'A is notified of this instruction ([19]). At this time, the disk cache 504'A of the migration source storage apparatus 5'A is set to off, and the disk cache 504'A of the migration destination storage apparatus 5'B is set to on. Because of this, input and output of data flowing to and from the external storage apparatus 6 via the host apparatus 2, migration source storage apparatus 5'A and migration destination storage apparatus 5'B is stopped ([16]), and on the other hand, input and output of data to and from the external storage apparatus 6 via the host apparatus 2 and the migration destination storage apparatus 5'B continues ([17]).

As shown in FIG. 23, the management terminal 7'A receiving notification that the path between the migration source storage apparatus 5'A and the external storage apparatus 6 is closed notifies the management terminal 7'B, and when the power supply of the migration source storage apparatus 5'A goes off, this operating procedure is complete ([20]).

Figure 24:
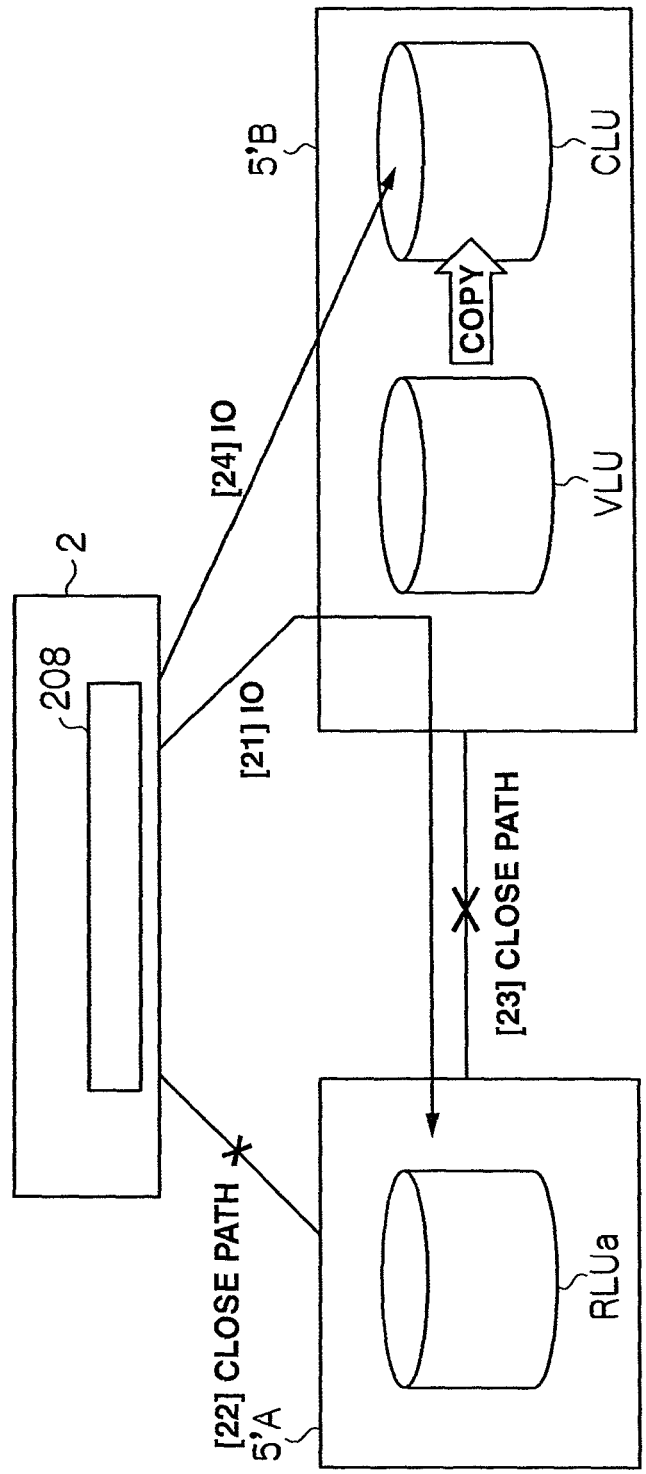
FIG. 24 is an outline view illustrating a supplemental migration function of the second embodiment.

As shown in FIG. 24, it is also possible to form a real volume (logical unit) RLUa within the migration source storage apparatus 5'A in place of the external volume PLU within the external storage apparatus 6. In this event, as in the second embodiment, the configuration information for the migration source storage apparatus 5'A saving the data from the host apparatus 2 to the real volume RLUa is edited, and the real volume RLUa is mapped to within the migration destination storage apparatus 5'B. The real volumes RLUa and the virtual volumes (logical units) within the migration destination storage apparatus 5'B correspond. The virtual volume VLU is then copied so as to form a copy volume (logical unit) CLU, and data of the real volume RLUa is migrated to the copy volume CLU.

The host apparatus 2 then sets an alternate path, an as in [7] of FIG. 20, input and output of data from the host apparatus 2 is carried out to and from the migration source storage apparatus 5'A via the host apparatus 2 and the migration destination storage apparatus 5'B ([21]), and the path for the host apparatus 2 and the migration source storage apparatus 5'A is closed ([22]). After this, in the event that the path between the migration source storage apparatus 5'A and the migration destination storage apparatus 5'B is broken ([23]), the input/output of data from the host apparatus 2 is carried out at the copy volume CLU ([24]).

Figure 25:
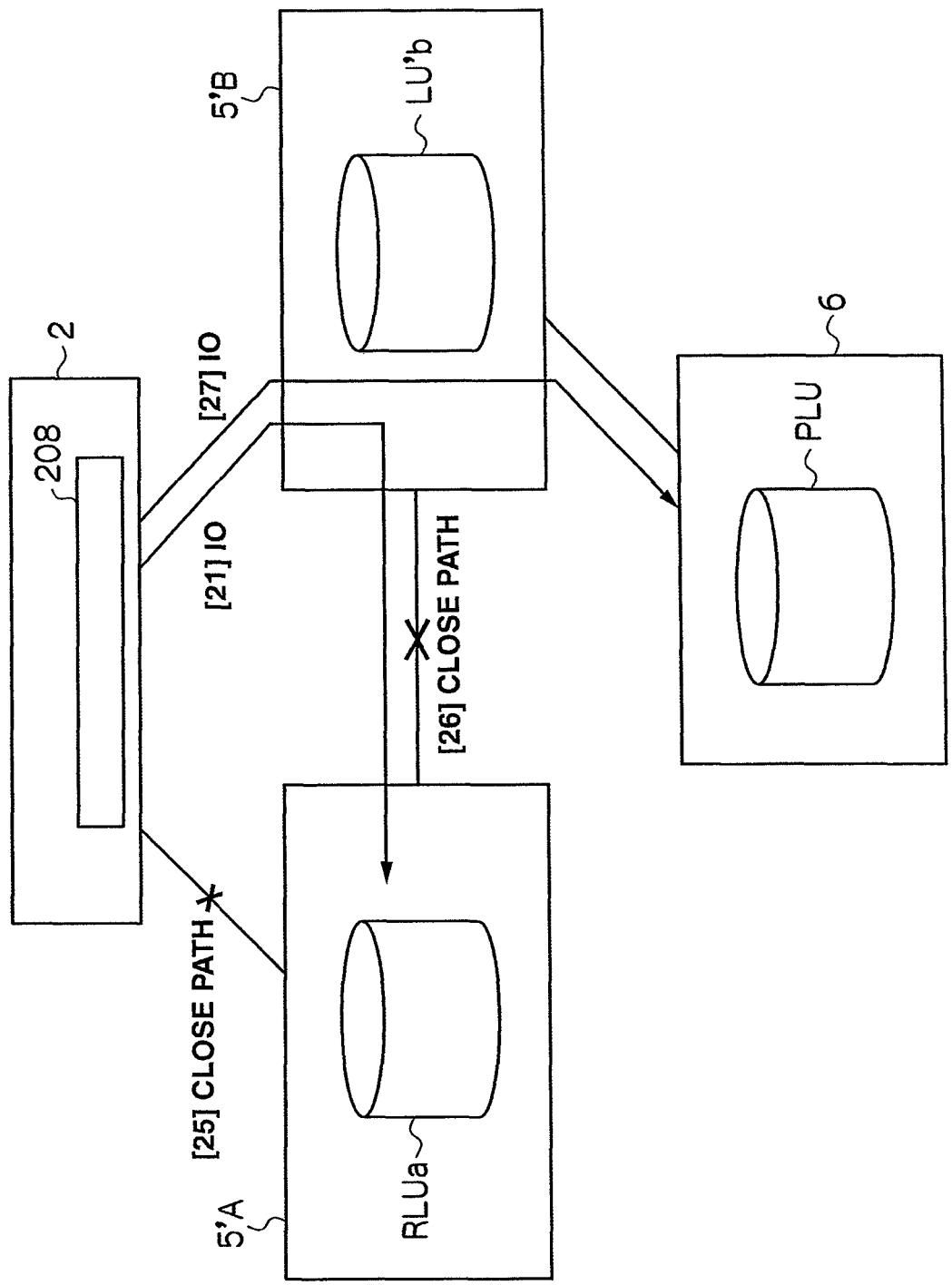
FIG. 25 is a further outline view illustrating a supplemental migration function of the second embodiment.

Further, as shown in FIG. 25, it is also possible to connect the migration destination storage apparatus 5'B and the external storage apparatus 6 rather than connecting the migration source storage apparatus 5'A and the external storage apparatus 6. In this case, a real volume (logical unit) RLUa is formed within the migration source storage apparatus 5'A. As in the second embodiment, the configuration information for the migration source storage apparatus 5'A saving the data from the host apparatus 2 to the real volume RLUa is edited, and the real volume RLUa is mapped to within the migration destination storage apparatus 5'B. In doing so, data within the real volume (logical unit) RLUa is saved within the external volume PLU within the external storage apparatus 6 in a manner correlating to the virtual volume (logical unit) LU'b via the virtual volume (logical unit) LU'b.

The host apparatus 2 then sets an alternate path, input and output of data from the host apparatus 2 is carried out to and from the migration source storage apparatus 5'A via the host apparatus 2 and the migration destination storage apparatus 5'B ([21]), and the path for the host apparatus 2 and the migration source storage apparatus 5'A is closed ([25]). After this, when the path for the migration source storage apparatus 5'A and the migration destination storage apparatus 5'B is cut ([26]), the input and output of data from the host apparatus 2 is carried out with the external volume PLU via the host apparatus 2 and the virtual volumes LU'b ([27]).

Figure 26:
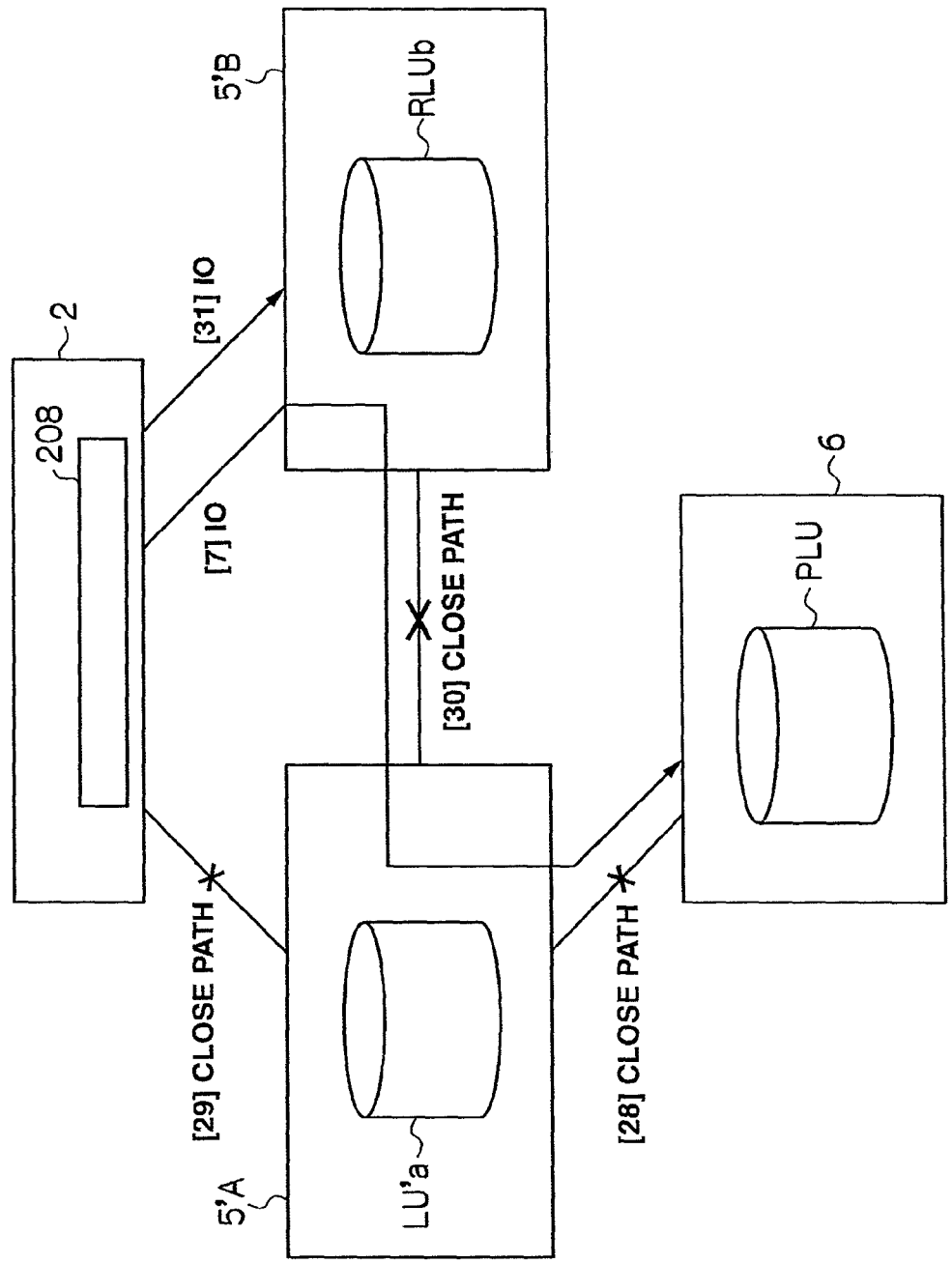
FIG. 26 is another outline view illustrating a supplemental migration function of the second embodiment.

Further, as shown in FIG. 26, it is also possible to connect the migration source storage apparatus 5'A and the external storage apparatus 6 rather than connecting the migration destination storage apparatus 5'B and the external storage apparatus 6. In this event, the external volumes PLU of the external storage apparatus 6 and the virtual volumes (logical units) LU'a within the migration source storage apparatus 5'A correlate. Real volume (logical units) LUb are then formed within the migration destination storage apparatus 5'B. As in the second embodiment, configuration information for the migration source storage apparatus 5'A is edited, and real volumes (logical unit) RLUb are mapped to the virtual volumes (logical units) LU'a.

The host apparatus 2 then sets the alternate path, and as shown in [7] of FIG. 20, the input and output of data from the host apparatus is carried out between the host apparatus 2 and the external storage apparatus 6 via the migration destination storage apparatus 5'B and the migration source storage apparatus 5'A ([7]), and the path for the migration source storage apparatus 5'A and the external storage apparatus 6 is closed ([28]). The path for the host apparatus 2 and the migration source storage apparatus 5'A is then closed ([29]). After this, in the event that the path between the migration source storage apparatus 5'A and the migration destination storage apparatus 5'B is broken ([30]), input and output of data from the host apparatus 2 is carried out at the real volume RLUb within the migration destination storage apparatus 5'B ([31]).

As mapping is carried out in units of logical units with migration of the storage apparatus 5 then taking place, it is possible to recognize the input and output of data from the host apparatus 2 towards the same logical unit. It is therefore possible to carry out migration of a storage apparatus without stopping input and output of data from the host apparatus 2.

(2-3) Effects of the Second Embodiment

According to this embodiment, it is possible to perform migration for an access destination of a host apparatus regardless of whether the migration source of data already saved or the migration destination for the data is an internal volume or external volume without having to stop exchanging of data between a host apparatus and a storage apparatus and while the storage apparatus continues to function.

According to this embodiment, it is possible to edit configuration control information of a migration source storage apparatus to give configuration control information matching with setting conditions for a migration destination storage apparatus. It is therefore possible to smoothly migrate data saved within a migration source storage apparatus to the same type of storage apparatus using the timing of stopping of the migration source storage apparatus.

(3) Third Embodiment

Next, a storage system of a third embodiment is described in the following. The configuration of the storage system of the third embodiment is the same as that of the storage system described in the second embodiment, and is therefore not described. Further, portions corresponding to portions of the first and second embodiments are given the same numbers and the corresponding portions are not described. Only portions that are different to the second embodiment are described in the description of the third embodiment.

Figure 27:
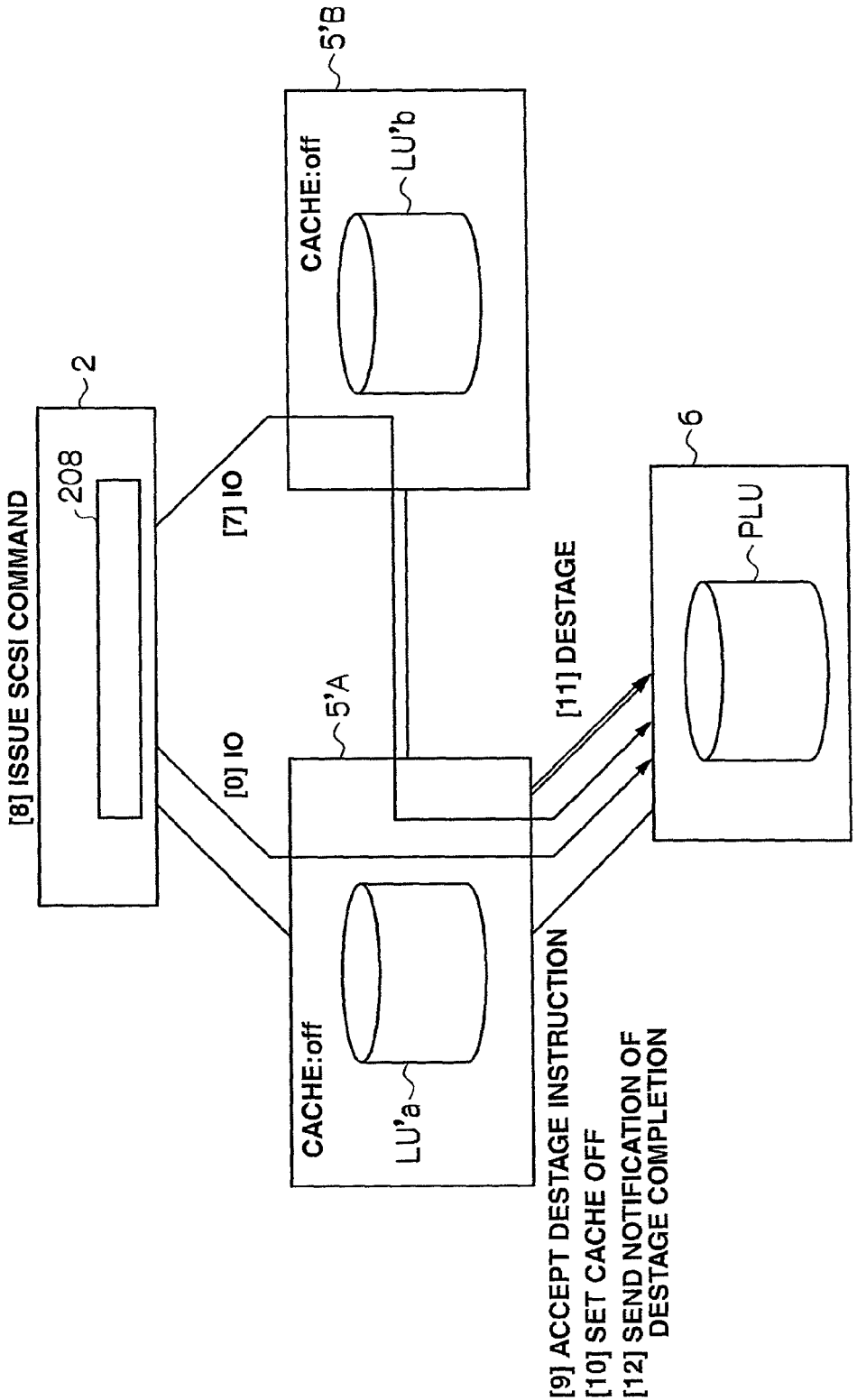
FIG. 27 is an outline view illustrating a migration function of a third embodiment.

In the operating procedure for the storage system of this embodiment, as shown in FIG. 27, a SCSI (Small Computer System Interface) command is provided in place of the staging instruction to the migration source storage apparatus 5'A from the host apparatus 2 via the management terminal 7'A in the second embodiment ([8]). At this time, input and output of data flows between the external storage apparatus 6 is carried out via the host apparatus 2, the migration source storage apparatus 5'A, and the migration destination storage apparatus 5'B ([7]). Further, input and output of data is carried out between the host apparatus 2 and the external volume PLU of the external storage apparatus 6 via the migration source storage apparatus 5'A ([0]).

For example, a specific SCSI command may be a start/stop command that instructs the disk 506'A of the migration source storage apparatus 5'A to start/stop.

SCSI command is supplied from the host apparatus 2 to the migration source storage apparatus 5'A, at the migration source storage apparatus 5'A, when a storage instruction is provided, the command is internally interpreted, and destaging takes place from the disk cache of the migration source storage apparatus 5'A to the external volume PLU ([9]).

The operating procedure after his is the same as that of the second embodiment and is therefore not described.

According to this embodiment, it is possible to migrate to an access destination of a host apparatus without having to stop the exchange of data between a host apparatus and a storage apparatus and while continuing the functions of the storage apparatus.

Further, the load on the storage system is alleviated because a standard command issued by the host apparatus is interpreted internally within the migration source storage apparatus and staging is carried out.

(4) Fourth Embodiment

Next, a description is given in the following of a storage system of a fourth embodiment. The same numerals are given to aspects of the configuration that are the same as for the first embodiment. Only aspects of the configuration that are different to the first embodiment are described in the description of the fourth embodiment.

As shown in FIG. 1, numeral 1" is the whole of a storage system of the fourth embodiment.

Figure 28:
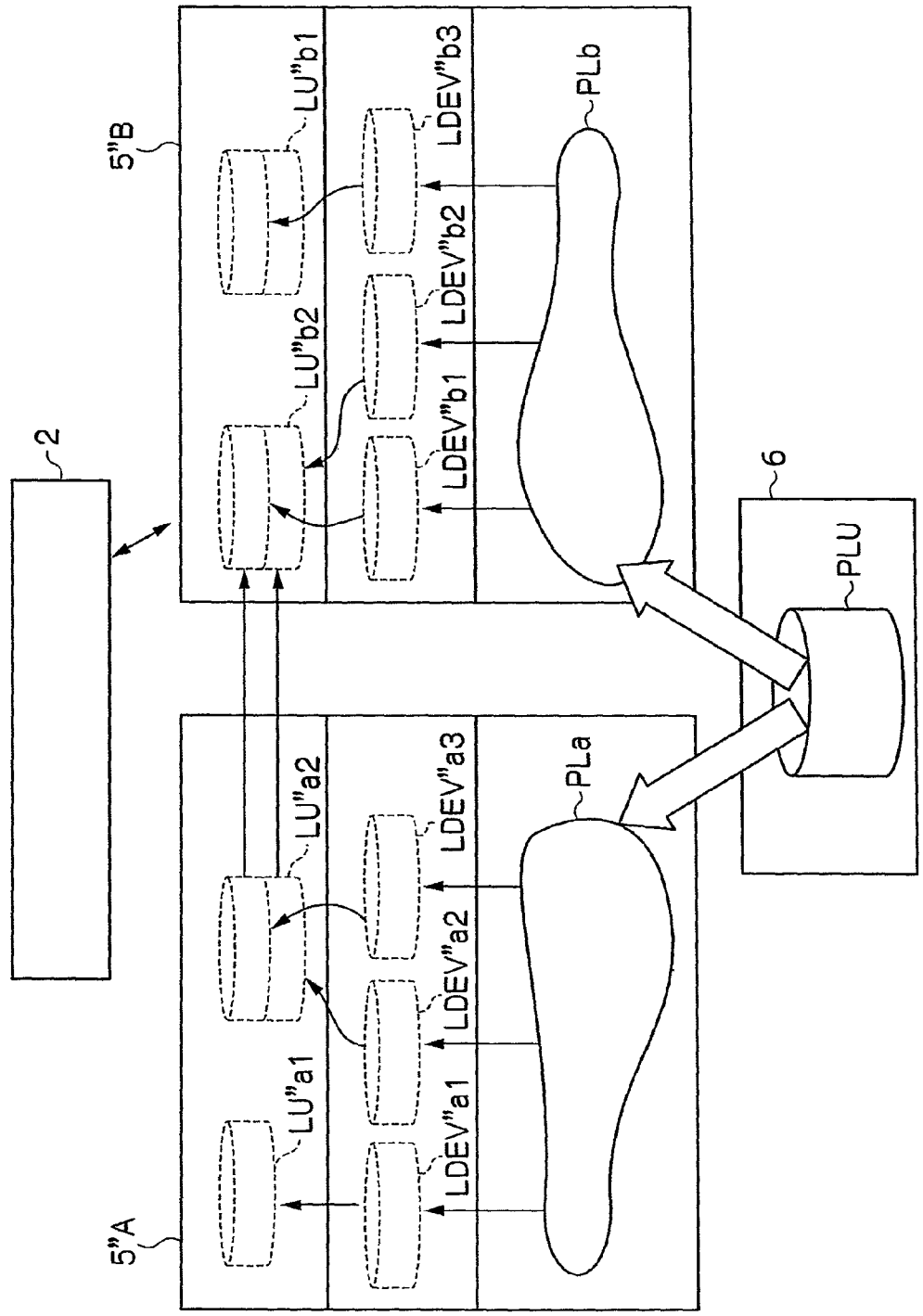
FIG. 28 is an outline view showing an overall configuration for a storage system of a fourth embodiment.
Figure 29:
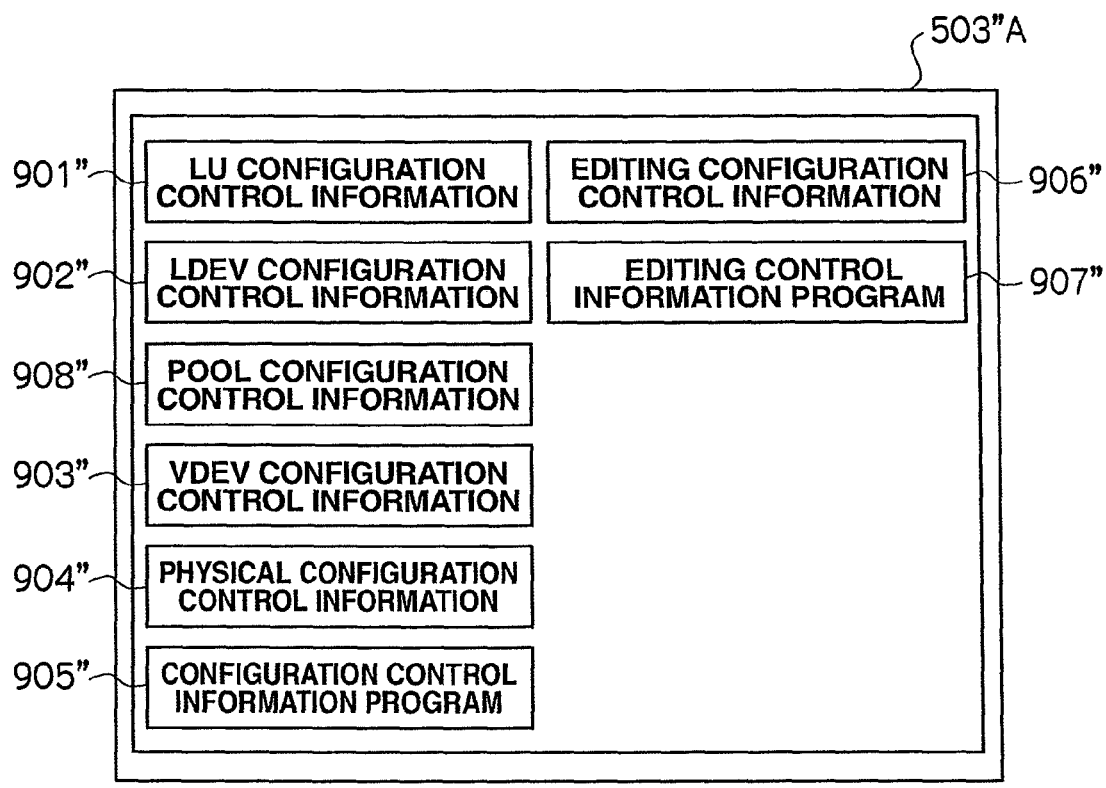
FIG. 29 is a block view showing within memory of a management terminal of the fourth embodiment.

As shown in FIG. 28, pool volumes PLa, PLb are used in part of the tiered storage as a storage system 1" of this embodiment. Using a function referred to as AOU (Allocation on Use) storage regions of the physical device 604 are supplied to give a dynamic storage region so as to form pool volumes PLa and PLb.

A description is not given of various configuration control information for the storage system 1" possessing this tiered storage.

In order to implement this kind of migration function, as shown in FIG.

29, LU configuration control information 901", LDEV configuration control information 902", VDEV configuration control information 903", physical configuration control information 904", configuration control information program 905", editing configuration control information 906" that is configuration control information relating to the logical units LU'"a of the migration source that is edited in such a manner as to match with the format of the migration destination storage apparatus 5"B, and an editing control configuration program 907" for managing this editing configuration control information are stored in memory 703"A of management terminal 7"A.

In addition, pool configuration control information 908" is stored in the memory 703" of the management terminal 7"A.

In this embodiment, LU configuration control information 901", VDEV configuration control information 903", physical configuration control information 903", configuration control information program 905", editing configuration control program 906", and editing control information program 907" are the same as the configuration control information for the first embodiment and are not described.

Figure 30:
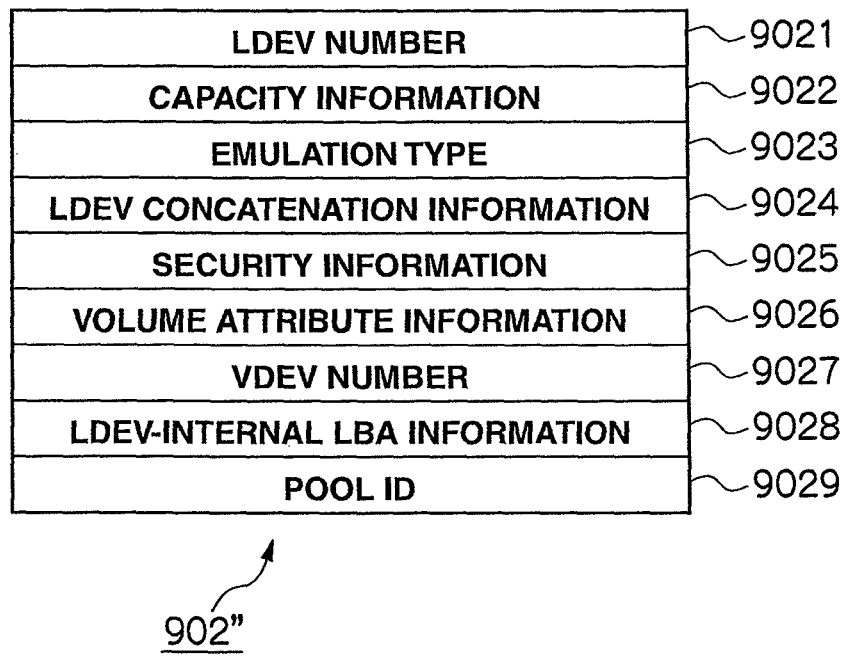
FIG. 30 is a schematic showing LU configuration control information of the fourth embodiment.

LDEV configuration control information 902" is configuration control information for the logical device LDEV". As shown in FIG. 30, a pool ID 9029 identifying the pool volume PL is stored in the LDEV configuration control information 902". Other aspects of the configuration are the same as for the LDEV configuration control information 902 of the first embodiment and are therefore not described.

Pool configuration control information 908" is configuration control information for the pool volume PL constituted by a dynamic storage region supplied as a storage region of the physical device 604.

Figure 31:
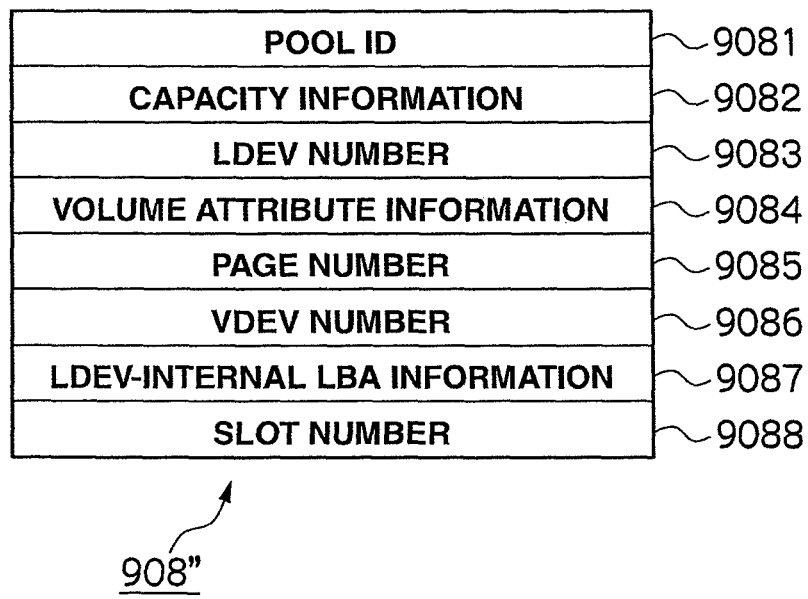
FIG. 31 is a further schematic showing LDEV configuration control information of the fourth embodiment.

As shown in FIG. 31, the pool configuration control information 908" is configured from a pool ID 9081 for identifying a pool volume PL, capacity information 9082 indicating the capacity of the pool volume, an LDEV number 9083 indicating a logical device number correlated to the pool volume PL, pool attribute information 9084 indicating whether the volume correlating to the logical device LDEV is a real volume or a virtual volume, a page number 9085 indicating an allocation number further allocating the logical device LDEV" where the pool volume PL corresponds to an LDEV number in page units, a VDEV number 9086 that is a device number for the virtual device VDEV" correlated to the pool volume ID, LBA information 9087 for within LDEV that is LBA (Logical Block Addressing) within the virtual device VDEV, and a slot number 9088 indicating an allocation number further allocating the virtual volume VDEV" corresponding to a VDEV number that is at the same tier as the pool volume PL in slot units.

The operation procedure for the storage system of this embodiment is a procedure where a migration function using volume attributes of logical units LU as real volumes operates taking the volume attributes of the logical units LU" as a virtual volume. This procedure is the same as for the first embodiment and is therefore not described.

According to this embodiment, it is possible to migrate to an access destination of a host apparatus without having to stop the exchange of data between a host apparatus and a storage apparatus and while continuing the functions of the storage apparatus.

Further, it is possible to improve system performance of the storage system in order to more broadly utilize data address space using a pool volume at the tiered storage.

(5) Further Embodiment

As a host apparatus 2 taken as a host apparatus for carrying out input/output requests for data, it is also possible to provide a migration source storage apparatus 5A having logical units LUa for a migration source formed on a storage region of the physical device 604 storing data that can be recognized from the host apparatus, and a migration destination apparatus 5B having logical units LUb for a migration destination that can be recognized from the host apparatus. An editing unit for editing configuration control information 901 to 904 relating to logical units LUa of the migration source in such a manner as to match settings of the migration destination storage apparatus 5B is provided at memory within the management terminal 7A with a CPU carrying out this editing processing, but the editing processing may also be carried out by a CPU and memory within the migration source storage apparatus 5A.

The an importing unit that imports editing configuration control information 906 that is the configuration control information edited into the migration destination storage apparatus 5B and a mapping unit that maps logical units LUa of the migration source to logical units LUb of the migration destination are provided at memory within the management terminal 7B with a CPU then carrying out processing but may also be carried out by a CPU and memory within the migration destination storage apparatus 5B.

Pool volumes PL taken as migration source and migration destination volumes are provided within the migration source storage apparatus 5A and the migration destination storage apparatus 5B but may also be provided within the external storage apparatus 6.

Storage regions of the physical device 604 of the external storage apparatus 6 are supplied so as to form the pool volumes PLa and PLb for the migration source and the migration destination but it is also possible to have a mix of pool volumes where the physical device 506A of the migration source storage apparatus 5A and the physical device 604 of the external storage apparatus 6 are taken as a migration source pool volume and the physical device 506B of the migration destination storage apparatus 5B and the physical device 604 of the external storage apparatus 6 are taken as the migration destination pool volume.

Further, pool attributes of the pool volume PL may be real volumes or virtual volumes.

The logical units LUa of the migration source are mapped to within the migration destination storage apparatus 5B but may also be mapped to the external storage apparatus 6.

The present invention may be broadly applied to storage systems having one or a plurality of storage apparatus or to other embodiments of storage systems.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A storage system comprising:
a physical device for storing data;
a first storage apparatus that manages at least one first logical unit, the at least one first logical unit being correlated to a storage region of said physical device;
a second storage apparatus that manages at least one second logical unit, the at least one second logical unit being correlated to said storage region of said physical device along with the first logical unit and recognized as being the same as the at least one first logical unit,
wherein each of the first storage apparatus and the second storage apparatus are coupled to a host apparatus via a respective path; and
wherein, said storage system has (1) a first status in which the host inputs/outputs data to/from the first storage apparatus and the second storage apparatus by switching between the first storage apparatus and the second storage apparatus, and (2) a second status in which either a respective path between the host apparatus and the first storage apparatus or a respective path between the host apparatus and the second storage apparatus is closed, and the host inputs/outputs data to/from either the first storage apparatus or the second storage apparatus over a respective path that is not closed.

2. The storage system according to the claim 1, further comprising:
an external storage apparatus including the physical device,
wherein the first storage apparatus and the second storage apparatus are coupled to the external storage apparatus.

3. The storage system according to the claim 2,
wherein, when (i) the second logical unit is a migration destination for data migrated from the first logical unit and (ii) the storage apparatus is in the second status in which the respective path between the host apparatus and the second storage apparatus is closed, then the system:
moves to the first status after connecting the respective path between the host apparatus and the second storage apparatus and the host apparatus recognize the second logical unit, and
moves to the second status after closing the respective path between the host apparatus and the first storage apparatus to complete the migration from the first logical unit to the second logical unit.

4. The storage system according to the claim 3,
wherein each said first storage apparatus and said second storage apparatus has a disk cache, which can be set to an on or off condition, for temporarily storing data from the host apparatus, and
wherein, when the data is input to or output from the first storage apparatus with respect to the external storage apparatus via a corresponding path, a disk cache of the first storage apparatus is set to on, and a disk cache of the second storage apparatus is set to off,
wherein the input/output request from the host apparatus to the second storage apparatus is transmitted to the external storage apparatus via the first storage apparatus,
wherein, when the data is input to or output from the second storage apparatus with respect to the external storage apparatus via a corresponding path, the disk cache of the second storage apparatus is set to on, and the disk cache of the first storage apparatus is set to off, and
wherein the input/output request from the host apparatus to the first storage apparatus is transmitted to the external storage apparatus via the second storage apparatus.

5. The storage system according to the claim 3:
wherein the first storage apparatus destages data from a disk cache which temporarily stores the data and is located in the first storage apparatus, based on a command from the host apparatus.

6. The storage system according to the claim 1: wherein the second logical unit is a migration destination for data migrated from the first logical unit.

7. The storage system according to the claim 1:
wherein each respective path between the host and the first storage apparatus or the second storage apparatus is closable, based on a command from the host apparatus.

8. A method of operating a storage system having a physical device for storing data, a first storage apparatus that manages at least one first logical unit, the at least one first logical unit being correlated to a storage region of said physical device, a second storage apparatus that manages at least one second logical unit, the at least one second logical unit being correlated to said storage region of said physical device along with the first logical unit and recognized as being the same as the at least one first logical unit, and a respective path coupling each of the first storage apparatus and the second storage apparatus to a host apparatus, said method comprising:
establishing for said storage system, a first status in which the host inputs/outputs data to/from the first storage apparatus and the second storage apparatus by switching between the first storage apparatus and the second storage apparatus, and
establishing a second status in which either the respective path between the host apparatus and the first storage apparatus or the respective path between the host apparatus and the second storage apparatus is closed, and the host inputs/outputs data to/from either the first storage apparatus or the second storage apparatus over the respective path that is not closed.

9. The method of operating a storage system according to the claim 8 wherein (i) the system comprises an external storage apparatus that includes the physical device, and (ii) each of the first storage apparatus and the second storage apparatus is coupled to the external storage apparatus by a corresponding path.

10. The method of operating a storage system according to the claim 9,
wherein, when (i) the second logical unit is a migration destination for data migrated from the first logical unit and (ii) the storage apparatus is in the second status in which the respective path between the host apparatus and the second storage apparatus is closed, then the system is operative for:
moving to the first status after connecting the path between the host apparatus and the second storage apparatus and the host apparatus recognize the second logical unit, and
moving to the second status after closing the path between the host apparatus and the first storage apparatus to complete the migration from the first logical unit to the second logical unit.

11. The method of operating a storage system according to the claim 10, wherein each said first storage apparatus and said second storage apparatus has a disk cache, which can be set to an on or off condition, for temporarily storing data from the host apparatus, the method further comprising:
when the data is input to or output from the first storage apparatus with respect to the external storage apparatus via the corresponding path, setting a disk cache of the first storage apparatus to on, and setting a disk cache of the second storage apparatus to off, whereby an input/output request from the host apparatus to the second storage apparatus is transmitted to the external storage apparatus via the first storage apparatus, and
when the data is input to or output from the second storage apparatus with respect to the external storage apparatus via the corresponding path, the disk cache of the second storage apparatus is set to on, and the disk cache of the first storage apparatus is set to off, whereby an input/output request from the host apparatus to the first storage apparatus is transmitted to the external storage apparatus via the second storage apparatus.

12. The method of operating a storage system according to the claim 10, further comprising:
the first storage apparatus destaging data from the host apparatus, which is temporarily stored in a disk cache that is part of and located in the first storage apparatus, based on a command from the host apparatus.

13. The method of operating a storage system according to the claim 8: wherein the second logical unit is a migration destination for data migrated from the first logical unit.

14. The method of operating a storage system according to the claim 8, further comprising, closing a selected respective path between the host and the first storage apparatus or the second storage apparatus, based on a command from the host apparatus.

* * * * *